US009361415B1

(12) United States Patent
Ginetti et al.

(10) Patent No.: US 9,361,415 B1
(45) Date of Patent: Jun. 7, 2016

(54) METHOD, SYSTEM, AND COMPUTER PROGRAM PRODUCT FOR IMPLEMENTING A MULTI-FABRIC ELECTRONIC DESIGN SPANNING ACROSS MULTIPLE DESIGN FABRICS

(71) Applicant: Cadence Design Systems, Inc., San Jose, CA (US)

(72) Inventors: Arnold Ginetti, Antibes (FR); Taranjit Singh Kukal, Delhi (IN); Vikas Kohli, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/503,403

(22) Filed: Oct. 1, 2014

Related U.S. Application Data

(60) Provisional application No. 62/033,607, filed on Aug. 5, 2014.

(51) Int. Cl.
*G06F 17/50* (2006.01)

(52) U.S. Cl.
CPC ........ *G06F 17/5022* (2013.01); *G06F 2217/04* (2013.01); *G06F 2217/08* (2013.01); *G06F 2217/38* (2013.01); *G06F 2217/40* (2013.01); *G06F 2217/74* (2013.01)

(58) Field of Classification Search
CPC .................................................. G06F 17/5045
USPC ......................................... 716/100, 101, 102
See application file for complete search history.

(56) References Cited

U.S. PATENT DOCUMENTS

| | | | |
|---|---|---|---|
| 4,457,027 A * | 7/1984 | Gladstone | A42B 1/046 2/174 |
| 5,396,435 A | 3/1995 | Ginetti | |
| 5,426,591 A | 6/1995 | Ginetti et al. | |
| 5,633,803 A | 5/1997 | Silve et al. | |
| 5,638,290 A | 6/1997 | Ginetti et al. | |
| 5,726,902 A | 3/1998 | Mahmood et al. | |
| 5,751,596 A | 5/1998 | Ginetti et al. | |
| 5,764,525 A | 6/1998 | Mahmood et al. | |
| 5,825,658 A | 10/1998 | Ginetti et al. | |
| 5,841,663 A | 11/1998 | Sharma et al. | |

(Continued)

OTHER PUBLICATIONS

Hon-Chi Ng, "Cpr E 305 Laboratory Tutorial ¾ Verilog Syntax: Summary of Verilog Syntax" Last Updated: Feb. 7, 2001.

(Continued)

*Primary Examiner* — Sun Lin
(74) *Attorney, Agent, or Firm* — Vista IP Law Group, LLP

(57) ABSTRACT

Various embodiments implement multi-fabric designs by using respective EDA tools associated with multiple design fabrics to access their respective native design data. Each EDA tool has access to and processes or manipulates its corresponding native design data; and no EDA tools have the visibility of the entire multi-fabric electronic design. Requests for actions are automatically transmitted among these EDA tools to instantiate desired EDA tools and to descend or ascend the multi-fabric design structure so that native design data in a particular design fabric are processed by the corresponding EDA tool(s) within the context of the other design fabrics. These techniques enable designers to implement, check, verify, simulate, analyze, probe, and netlist the entire electronic design across multiple design fabric.

20 Claims, 11 Drawing Sheets

(56) References Cited

U.S. PATENT DOCUMENTS

| | | | |
|---|---|---|---|
| 5,896,299 | A | 4/1999 | Ginetti et al. |
| 5,956,257 | A | 9/1999 | Ginetti et al. |
| 6,086,621 | A | 7/2000 | Ginetti et al. |
| 6,113,647 | A | 9/2000 | Silve et al. |
| 6,145,117 | A | 11/2000 | Eng |
| 6,170,080 | B1 | 1/2001 | Ginetti et al. |
| 6,353,612 | B1 | 3/2002 | Zhu |
| 6,378,116 | B1 | 4/2002 | Ginetti |
| 6,401,128 | B1 | 6/2002 | Stai |
| 6,405,345 | B1 | 6/2002 | Ginetti |
| 6,519,743 | B1 | 2/2003 | Nauts et al. |
| 6,622,290 | B1 | 9/2003 | Ginetti et al. |
| 6,622,291 | B1 | 9/2003 | Ginetti |
| 7,143,341 | B1 | 11/2006 | Kohli |
| 7,168,041 | B1 | 1/2007 | Durrill et al. |
| 7,257,799 | B2 * | 8/2007 | McKenney ......... G06F 17/5045 716/117 |
| 7,468,982 | B2 * | 12/2008 | Mehra ................ H04L 45/00 370/386 |
| 7,490,308 | B2 | 2/2009 | Gonzalez et al. |
| 7,555,739 | B1 | 6/2009 | Ginetti et al. |
| 7,634,743 | B1 | 12/2009 | Ginetti |
| 7,779,286 | B1 * | 8/2010 | Pritchard ............ G06F 17/5045 713/400 |
| 7,802,221 | B1 * | 9/2010 | Brink ................. G06F 17/5045 716/121 |
| 7,949,987 | B1 | 5/2011 | Ginetti et al. |
| 7,971,175 | B2 | 6/2011 | Ginetti |
| 7,971,178 | B1 | 6/2011 | Marwah et al. |
| 7,990,375 | B2 | 8/2011 | Kohli et al. |
| 8,046,730 | B1 | 10/2011 | Ferguson et al. |
| 8,136,071 | B2 * | 3/2012 | Solomon ............. G06F 17/5045 257/211 |
| 8,145,458 | B1 | 3/2012 | Kukal et al. |
| 8,191,035 | B1 * | 5/2012 | Van Brink .......... G06F 17/5045 716/126 |
| 8,255,845 | B2 | 8/2012 | Ginetti |
| 8,261,228 | B1 | 9/2012 | Gopalakrishnan et al. |
| 8,271,933 | B1 | 9/2012 | Kohli et al. |
| 8,281,272 | B1 | 10/2012 | Ginetti |
| 8,286,025 | B1 * | 10/2012 | Pritchard ............ G06F 17/5045 713/400 |
| 8,286,110 | B1 | 10/2012 | Kukal et al. |
| 8,316,337 | B2 | 11/2012 | Bhattacharya et al. |
| 8,316,342 | B1 | 11/2012 | Kukal et al. |
| 8,347,261 | B2 | 1/2013 | Ginetti et al. |
| 8,364,656 | B2 | 1/2013 | Arora et al. |
| 8,438,524 | B1 | 5/2013 | Kohli et al. |
| 8,452,582 | B1 | 5/2013 | Al-hawari et al. |
| 8,453,136 | B1 | 5/2013 | Hahn et al. |
| 8,479,134 | B2 | 7/2013 | Bhattacharya et al. |
| 8,521,483 | B1 | 8/2013 | Kukal et al. |
| 8,527,929 | B2 | 9/2013 | Bhattacharya et al. |
| 8,527,934 | B2 | 9/2013 | Ginetti et al. |
| 8,566,767 | B1 | 10/2013 | Kukal et al. |
| 8,594,988 | B1 | 11/2013 | Spyrou et al. |
| 8,631,181 | B2 | 1/2014 | Feehrer |
| 8,645,894 | B1 | 2/2014 | Kukal et al. |
| 8,656,329 | B1 | 2/2014 | Kukal et al. |
| 8,719,754 | B1 | 5/2014 | Ginetti |
| 8,732,636 | B2 | 5/2014 | Ginetti et al. |
| 8,732,651 | B1 | 5/2014 | Kukal et al. |
| 8,762,906 | B2 | 6/2014 | Ginetti et al. |
| 8,769,455 | B1 | 7/2014 | Singh et al. |
| 8,806,405 | B2 | 8/2014 | Colwell |
| 8,898,039 | B1 | 11/2014 | Kukal et al. |
| 8,910,100 | B1 | 12/2014 | Wilson et al. |
| 8,930,878 | B1 * | 1/2015 | Leef ................... G06F 17/5045 716/136 |
| 2003/0051222 | A1 | 3/2003 | Williams et al. |
| 2003/0196182 | A1 | 10/2003 | Hahn |
| 2004/0034842 | A1 | 2/2004 | Mantey |
| 2004/0156322 | A1 * | 8/2004 | Mehra ................. H04L 45/583 370/254 |
| 2005/0273732 | A1 | 12/2005 | Xu |
| 2006/0111884 | A1 | 5/2006 | McGaughy et al. |
| 2007/0229537 | A1 | 10/2007 | Kohli et al. |
| 2008/0301600 | A1 | 12/2008 | Kumagai |
| 2009/0007031 | A1 | 1/2009 | Ginetti et al. |
| 2010/0031209 | A1 | 2/2010 | Luan et al. |
| 2010/0115207 | A1 | 5/2010 | Arora et al. |
| 2010/0306729 | A1 | 12/2010 | Ginetti |
| 2011/0041106 | A1 | 2/2011 | Li et al. |
| 2011/0061034 | A1 | 3/2011 | Ginetti et al. |
| 2011/0153288 | A1 | 6/2011 | Bhattacharya et al. |
| 2011/0153289 | A1 | 6/2011 | Bhattacharya et al. |
| 2011/0154276 | A1 | 6/2011 | Bhattacharya et al. |
| 2011/0161899 | A1 | 6/2011 | Ginetti et al. |
| 2011/0161900 | A1 | 6/2011 | Ginetti et al. |
| 2011/0173582 | A1 | 7/2011 | Bhattacharya et al. |
| 2012/0047434 | A1 | 2/2012 | Ginetti |
| 2013/0097572 | A1 | 4/2013 | Ginetti et al. |
| 2013/0246900 | A1 | 9/2013 | Ginetti et al. |
| 2013/0290834 | A1 | 10/2013 | Ginetti et al. |
| 2014/0123094 | A1 | 5/2014 | Colwell et al. |
| 2014/0223402 | A1 | 8/2014 | Satou |

OTHER PUBLICATIONS

Stuart Sutherland, "Verilog HDL: Quick Reference Guide" 2001.
"Summary of Verilog Syntax" URL: http://www.verilogtutorial.info/chapter_3.htm, 2007, Accessed on Sep. 2, 2014.
Non-Final Office Action dated Apr. 13, 2015 for U.S. Appl. No. 14/503,408.
Non-Final Office Action dated Apr. 16, 2015 for U.S. Appl. No. 14/503,407.
Notice of Allowance dated Aug. 21, 2015 for U.S. Appl. No. 14/503,406.
Notice of Allowance dated Oct. 28, 2015 for U.S. Appl. No. 14/503,407.
Notice of Allowance dated Oct. 29, 2015 for U.S. Appl. No. 14/503,408.
Ex-parte Quayle Action dated Nov. 2, 2015 for U.S. Appl. No. 14/503,404.

* cited by examiner

METHOD, SYSTEM, AND COMPUTER PROGRAM PRODUCT FOR IMPLEMENTING A MULTI-FABRIC ELECTRONIC DESIGN SPANNING ACROSS MULTIPLE DESIGN FABRICS

CROSS-REFERENCE TO RELATED PATENT APPLICATIONS

This patent application claims the benefit of U.S. Prov. Patent App. Ser. No. 62/033,607 filed on Aug. 5, 2014 and entitled "METHOD, SYSTEM, AND COMPUTER PROGRAM PRODUCT FOR IMPLEMENTING, VERIFYING, AND/OR ANALYZING A MULTI-FABRIC ELECTRONIC DESIGN SPANNING ACROSS MULTIPLE DESIGN FABRICS". This application is also cross related to U.S. patent application Ser. No. 14/503,408 filed concurrently and entitled "METHODS, SYSTEMS, AND ARTICLES OF MANUFACTURE FOR BACK ANNOTATING AND VISUALIZING PARASITIC MODELS OF ELECTRONIC DESIGNS", U.S. patent application Ser. No. 14/503,404 filed concurrently and entitled "METHODS, SYSTEMS, AND ARTICLES OF MANUFACTURE FOR PROBING OR NETLISTING A MULTI-FABRIC ELECTRONIC DESIGN SPANNING ACROSS MULTIPLE DESIGN FABRICS", U.S. patent application Ser. No. 14/503,406 filed concurrently and entitled "METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS", and U.S. patent application Ser. No. 14/503,407 filed concurrently and entitled "METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS". The contents of the aforementioned U.S. provisional patent application and U.S. patent applications are hereby incorporated by reference in their respective entireties for all purposes.

BACKGROUND

In conventional electronic designs, the integrated circuits, the IC packaging, and the printed circuit boards are often developed and designed independently. Modern electronic designs often include integrated circuits (ICs), their respective package designs, and a printed circuit board (PCB) incorporating multiple packaged integrated circuits to be developed in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may often desire to implement or tune the printed circuit design in the context of the packaging design fabric and/or the integrated circuit design fabric. As a practical example, consider the situation where an advanced package is to be incorporated onto a PCB for a consumer product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

Therefore, there exists a need for a multi-fabric design environment that provides a coherent framework to integrate the integrated circuit design fabric, the packaging design fabric, and the printed circuit board fabric in a seamless manner.

SUMMARY

Disclosed are method(s), system(s), and article(s) of manufacture for implementing a multi-fabric electronic design across multiple design fabrics in one or more embodiments. Some embodiments are directed at a method for implementing a multi-fabric electronic design across multiple design fabrics. The method includes the acts of identifying first design data in a multi-fabric electronic design using a first session of a first electronic design automation (EDA) tool in response to a request for processing the multi-fabric electronic design, wherein the first design data are native to the first EDA tool and are non-native to a second EDA tool; identifying second design data using a second session of the second EDA tool in response to a request for action issued by the first EDA tool for the request for processing the multi-fabric electronic design, wherein the second design data are native to the second EDA tool but not native the first EDA tool; and fulfilling the request by continuing to process the second design data using the second session of the second EDA tool.

In some of these embodiments, the method may further generate, in the first design fabric, a symbolic representation of the second design data in the multi-fabric electronic design using the session of the second EDA tool and the second design data. In some embodiments, the first design data are created, modified, or maintained by the first EDA tool without performing a transform on the first design data, and the second design data are created, modified, or maintained by the second EDA tool without performing the first transform or a second transform on the second design data. In addition or in the alternative, the method may further include the acts of representing the first design data as one or more first symbolic views in the second session of the second EDA tool; and representing the second design data as one or more second symbolic views in the first session of the first EDA tool. The second EDA tool may have no visibility of the first design data that exist only in the first design fabric, and the first EDA tool has no visibility of the second design data that exist only in the second design fabric in some of the embodiments described herein.

In addition or in the alternative, the method may further optionally track a state of the multi-fabric electronic design by using a data structure to monitor processing or manipulation of the multi-fabric electronic design. The first design data in the first design fabric and the second design data in the second design fabric are implemented with a single set of constraints governing both the first design fabric and the second design fabric or alternatively with their respective sets of constraints in response to the request for action, without generating new constraints. The first EDA tool and the second EDA tool may be devised to access their respective native design data and do not share design data of the multi-fabric electronic design with each other. In some embodiments, the multi-fabric electronic design needs not be complete and includes only a partial, incomplete design that comprises no design data for at least one design component in the first design fabric or in the second design fabric.

In some of these embodiments, the multi-fabric electronic design does not satisfy one or more design rules or constraints before the request for processing the multi-fabric electronic design is fulfilled. The method may further optionally include the acts of instantiating the second session of the second EDA tool by using at least the request for action from the first session of the first EDA tool; traversing one or more first circuit components in the first design data of the multi-fabric electronic design by using the first session of the first EDA tool; and traversing one or more second circuit components in the second design data of the multi-fabric electronic design by using the second session of the second EDA tool. In some embodiments, the method may further determine whether a net in the first design data or in the second design data comprises a vectored net, split a net representation of the net into multiple split net representations, and split an identification of the net into multiple split identifications. In some of these immediately preceding embodiments, the method may further associate the multiple split identifications with the multiple split net representations, and interconnect the net with one or more corresponding circuit components in the multi-fabric electronic design by replacing the net representation with the multiple split net representations.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
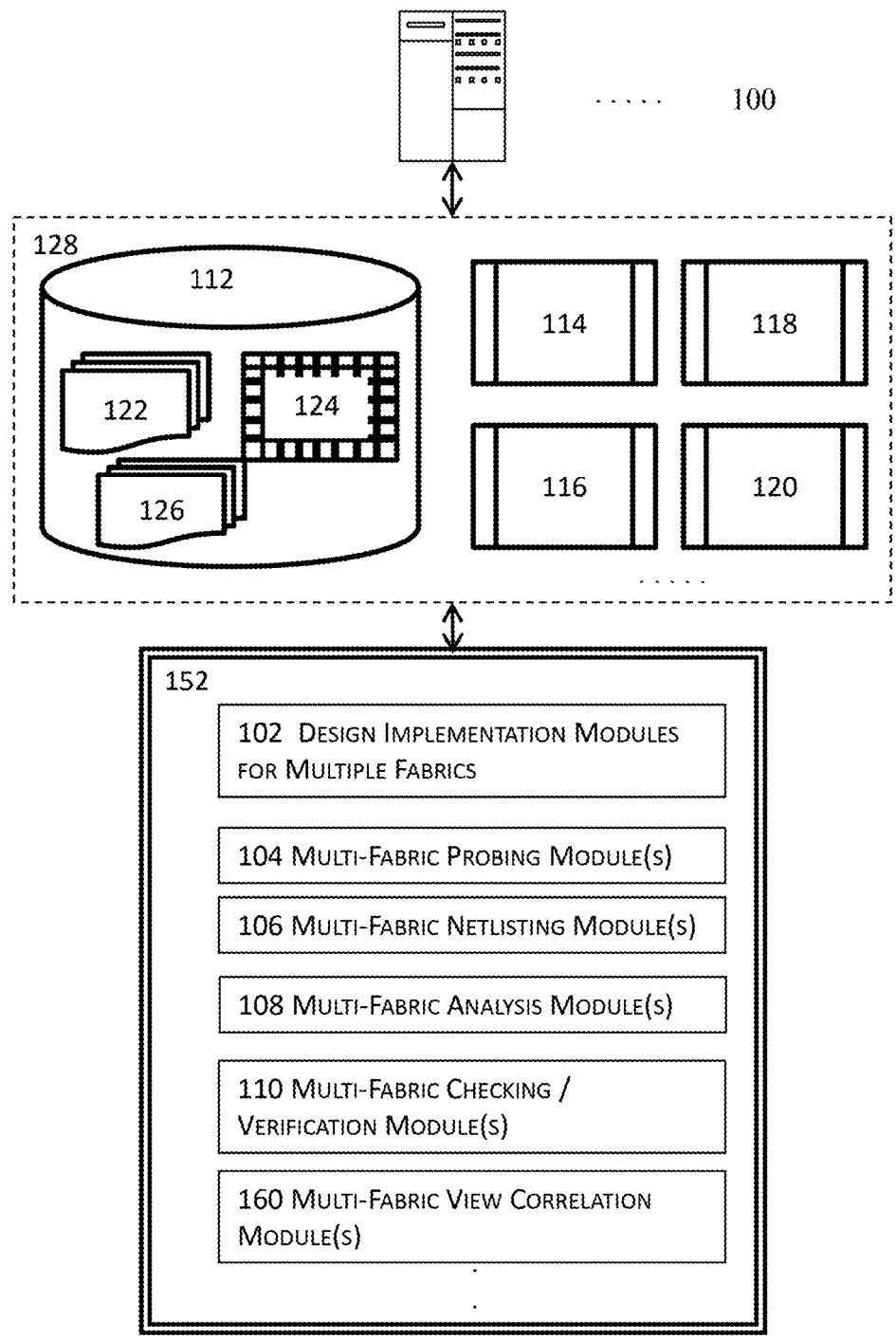
FIG. 1 illustrates a high level block diagram of a system for implementing a multi-fabric electronic design across multiple design fabrics in some embodiments.

Various embodiments of the invention are directed to methods, systems, and articles of manufacture for implementing, verifying or checking, and analyzing a multi-fabric electronic design across multiple design fabrics. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments perform planning and/or implementation of electronic designs across multiple fabrics within the context of each other to ensure proper performance as well as flexibility to work at a coarse level to establish initial placement then refine down to the individual byte lanes as a design emerges. In addition, these embodiments provide designers with the capability to quickly effectuate design changes (e.g., placement and net changes) in one fabric and immediately see the impact on adjacent fabrics by uniting design information or data of various sources and formats across multiple fabrics at various granularities and also by communicating data back and forth for the design implementation tools (e.g., electronic design automation or EDA tools) in multiple design fabrics to complete their respective designs.

These embodiments establish the relationship between the chip, chip package, the board, and the test bench by using hierarchy management techniques to establish and manage the relationships among the fabrics to enable representations of the complete system from the chip-level to the PCB (printed circuit board), while maintaining the integrity of individual design fabrics and providing simultaneous access to domain-specific and/or design fabric-specific data (e.g., macro placement, I/O pad ring devices, bump patterns, ball pad assignments, and placement of critical PCB components and connectors, etc.) These embodiments manage and manipulate a range of multi-fabric data at various stages of completeness of the design, and adapt as portions of the design become less abstract or more complete during the planning and/or implementation process.

In some embodiments, the techniques and methodologies described herein provide a multi-fabric design environment in an efficient and cost effective manner. One embodiment may implement such a multi-fabric design environment including various details of the packaging design and the printed circuit board design at different abstraction or hierarchical levels with different granularities in one or more integrated circuit design tools (e.g., a layout editor or a schematic editor). Such an implementation may leverage the editing, simulation, checking, verifying, testing, and analysis capabilities of the one or more integrated circuit design tools. Some embodiments may use different sets of design constraints or design rules (e.g., constraints or rules for a die design versus constraints or rules for a printed circuit board design) or even different domains of characteristics (e.g., electrical characteristics of electronic circuit designs versus physical characteristics of packaging or printed circuit board designs) of integrated circuit designs, packaging designs, and printed circuit board designs in performing various functions or acts described herein. Some other embodiments use a single unified set of design constraints or design rules or a single, unified data structure that has one or more common formats to accommodate different domains of characteristics in performing the functions or acts described herein.

Yet some other embodiments use two or more sets of views for different abstraction levels of the integrated circuit designs, the packaging design, and the printed circuit design. The two or more sets of views for different abstraction levels may include, for example, a set of symbolic views and a set of schematic views or layout views in some of these embodiments. A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block.

In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand. The two or more sets of view may further include other views such as layout views, gate level views, etc. at various other abstraction levels. With these two or more sets of views, these embodiments provide each design tool in each fabric with the appropriate set of views such that the design tool can properly perform its dedicated functionality.

A multi-fabric electronic design may have a hybrid hierarchy including a plurality of design fabrics, some of which may be included in others to form a hierarchical structure. For example, a PCB design may exist at a first hierarchical level in the PCB design fabric. The PCB design may further include an IC package which exists at a second hierarchical level under the first hierarchical level, and the IC package design may belong to the package design fabric. The IC package design may further include the IC design at a third hierarchical level for the IC design fabric under the second hierarchical level, at which the IC package design is situated. Unlike conventional hierarchical designs, the designers are not freely to ascend or descend the hierarchical structure because designs in different design fabrics may be described in different languages or formats and thus do not communicate with each other to provide the freedom for designers to freely move from one design fabric in one EDA tool session to another design fabric in another EDA tool session.

For example, some embodiments may provide the integrated circuit schematic view including the schematic design of a cell to the schematic editor or a schematic simulator such that the schematic editor may properly implement or simulate the schematic design represented by the integrated circuit schematic view. As another example, these embodiments may further provide a schematic view including the schematic design of a printed circuit board or an IC packaging design to the printed circuit board schematic editor or IC packaging schematic editor, respectively. These two or more sets of views may be stored in parallel and linked automatically in a streamline fashion such that a designer may navigate among different abstraction levels at various granularity levels. Moreover, various views at various granularity levels in different design fabrics may be tracked using one or more data structures that link, for example, a specific view (e.g., a schematic view of a cell) to the appropriate information or data (e.g., schematic design data of the cell). These one or more data structures may be of the same format or of different formats.

In addition or in the alternative, some embodiments may further provide symbolic views of circuit block designs or portions thereof to an electronic circuit design tool that performs its dedicated or intended functions in light of one or more other designs in one or more other fabric(s) as represented by the symbolic views. For example, the integrated circuit designer may use the integrated circuit schematic editor or simulator or layout editor to implement the physical design of an IC in light of the IC packaging design fabric and/or the printed circuit board design fabric. These embodiments may then provide the IC packaging design as a symbolic IC packaging design view and/or the printed circuit board design as a symbolic printed circuit board design view to the IC designer such that the IC designer may implement the IC design within the context and in light of the pertinent information of the IC packaging and/or the printed circuit board design.

Similarly, the IC packaging designer may also be provided with a symbolic integrated circuit design view for the integrated circuit design having sufficient design information or data for the IC packaging designer to implement or tune the IC packaging design in the context of the integrated circuit design. Each design tool therefore sees what the design tool needs to perform its intended or dedicated functions and is not burdened with unnecessary information that may adversely impacts the performance, effectiveness, and/or functionality of the design tool, while still receiving sufficient information or data from other fabrics or abstraction levels to aid the designer in using the design tool to implement or tweak the respective designs.

In addition to implementing or tweaking (e.g., fixing, improving, or optimizing) a design at a particular abstraction level in a specific fabric, another advantage of these embodiments is that a design team working in different geographies may transmit some form of abstracted design information or data from a first team member (e.g., an IC designer) working in a first fabric at the first location to a second team member (e.g., an IC packaging designer) working in a second fabric at a second location. The second team member may not only implement or tweak his or her own design within the context of the design in the first fabric but also revise and transmit the abstracted design back to the first team member who may in turn accept, partially accept, or reject the revised abstracted design.

Yet another advantage of these embodiments is that these embodiments may better manage large block or cell symbols by splitting a large symbol into multiple split symbols and placing its ports across design schematics, especially near the circuitry to which they are connected. As the complexity of the designs is constantly increasing and more and more logic is being placed inside hierarchical blocks, the number of interfaces that are exposed by the hierarchical block has increased dramatically such that the increased number of interfaces means more pins are required on the block symbol. As a result, a block symbol may become so large (e.g., a device having a large pin count) that it may not be placed on a standard page border. Such a large block symbol (or a block symbolic representation) may also become difficult to manage because of the sheer number of pins coming out of the same symbol.

Various embodiments described herein also better manage hierarchical block symbols by splitting these symbols into multiple split symbols. Rather than generating a big monolithic symbol, these embodiments provide an option to split the ports of a hierarchical block over multiple symbols. Splitting a large symbol into multiple split symbols reduces the size of the large symbol. In addition, these embodiments may logically categorize the ports and placed these ports on different symbols to create symbols that may be placed across, for example, schematic sheets, especially near the circuitry to which they connect to. In splitting a larger symbol or representation into multiple, smaller symbols or representations, an identification (e.g., a name or other types of identifier) may also be split into multiple split identifications corresponding to the multiple, smaller symbols.

In one or more embodiments, FIG. 1 shows an illustrative high level schematic block diagrams for implementing a multi-fabric electronic design across multiple design fabrics and may comprise one or more computing systems 100, such as a general purpose computer described in the System Architecture Overview section to implement one or more special proposes. In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof in a multi-fabric design environment 152 that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics, one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block. In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand.

In some embodiments, a symbolic view may be stored or linked together with a schematic view or layout view of a circuit component, block, or cell by using, for example, a profile. The profile may further include or be associated with other information or data including, for example, parasitic information (e.g., capacitances, resistances, etc.), electrical information (e.g., currents, voltages, inductances, etc.), physical information (e.g., sizes or profiles of various shapes, etc.), timing or delay information of the electronic design of interest, other performance-related information, analysis results (e.g., EMI or electromagnetic interference analyses, ISI or inter-symbol interference analyses, cross-talk analyses, etc.), simulation results in various domains and/or fabrics, or any combinations thereof in some of these embodiments. The multi-fabric view correlation module 160 may also correlate the aforementioned information or data with the multi-fabric electronic design, a portion thereof, or the corresponding designs of circuit component in the multi-fabric electronic design. In some embodiments, the multi-fabric view correlation module 160 may further annotate the pertinent portions or circuit component designs with some or all of the aforementioned information or data.

Figure 2A:
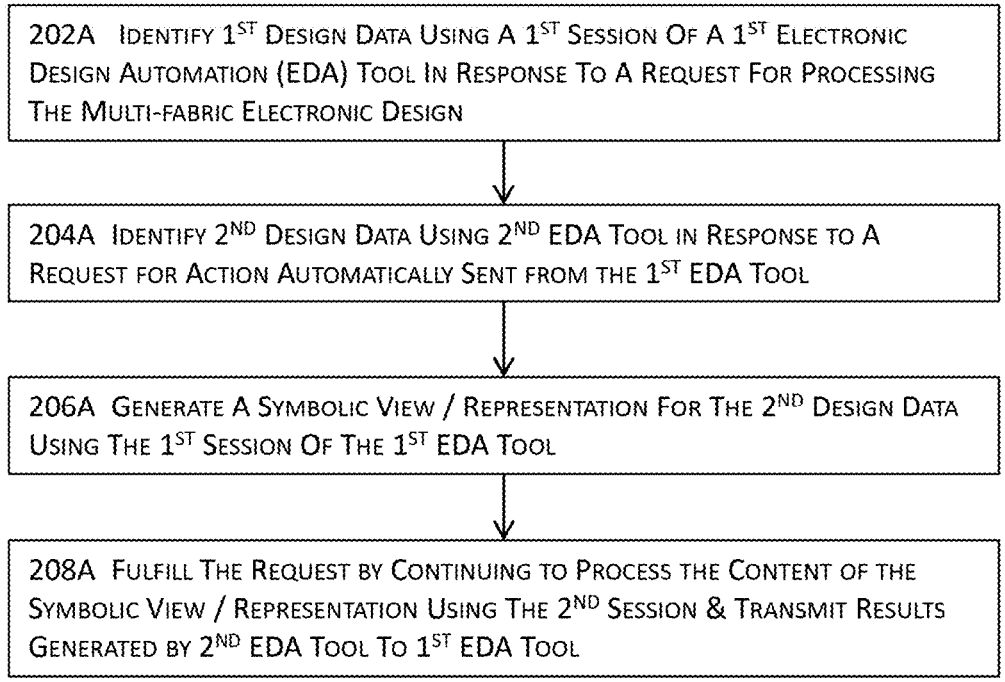
FIG. 2A illustrates a high level block diagram of a system for implementing a multi-fabric electronic design across multiple design fabrics in some embodiments.

FIG. 2A illustrates a high level block diagram for a system for implementing a multi-fabric electronic design across multiple design fabrics in some embodiments. In some embodiments, implementing a multi-fabric electronic design may include generating, modifying, or fixing a multi-fabric electronic design or a portion thereof, analyzing or simulating the multi-fabric electronic design or a portion thereof, probing a multi-fabric electronic design or a portion thereof, netlisting a multi-fabric electronic design or a portion thereof, or testing, checking, or verifying a multi-fabric electronic design or a version thereof. In some embodiments illustrated in FIG. 2A, the method or system may identify first design data using a first session of a first electronic design automation (EDA) tool in response to a request for processing the multi-fabric electronic design at 202A.

The first EDA tool may include any EDA tools (e.g., a schematic editor, a schematic simulator, a layout tool, a physical verification tool, a design rule check (DRC) tool, etc.) for natively accessing design data in any design domains (e.g., schematic, layout, etc.) in an integrated circuit design fabric, any EDA tools in a packaging design fabric, any EDA tools in a printed circuit board design fabric, or any EDA tools in the test bench design fabric. An EDA tool may natively access design data or any other data if the EDA tool may be used to generate, access, and/or maintain the design data without performing any transformation, mapping, export, or abstraction (collectively transform or transformation) on the design data in some embodiments. In some of these embodiments, only design data that are native to an EDA tool are visible to and accessible by the EDA tool. In these embodiments, design data are non-native to an EDA tool if the EDA tool cannot access the design data without performing some transformation, exportation, or mapping on the design data. In some of these embodiments, design data that are non-native to an EDA tool are invisible to and hence inaccessible by the EDA tool.

Processing native design data with respective EDA tools provides an advantage of not having to generate two or more representations of the same set of design data for implementing any portion of a multi-fabric electronic design. Another advantage is that design data need not be protected by, for example, read-only access because no design data need to be shared between two EDA tools so there will be no concurrent access to the same piece of design data to cause inconsistencies. This native access is in sharp contrast with conventional, collaborative design environments where some design data are shared between two or more circuit design tools and thus need protection such as read-only access for the shared design data.

The read-only access to some design data in the conventional approaches hinders the ability of cross-improve or cross-optimize such design data within the context of other design data in one or more other design fabrics. The read-only access to some design data may further hinder the ability of improve or optimize other design data within the context of the read-only protected design data. Using respective EDA tools to process their respective native design data as described herein may also provide another advantage in that only the EDA tools responsible for creating, modifying, or maintaining the native design data have visibility of the native design data, while the other EDA tools only see, for instance, one or more symbolic views or representations of such design data, instead of different representations of the same design data. In these embodiments, design data of a circuit component exist in one and only one design fabric and are visible only to the EDA tools to which the design data are native.

When an EDA tool encounters non-native design data, the EDA tool may instantiate a symbol or invoke a native EDA tool to instantiate a symbol (e.g., by using a request for action) for the non-native design data and has no knowledge or visibility of the actual design data in these embodiments. In some of these embodiments, the EDA tool may nevertheless expose at least the pertinent information including the pertinent connectivity information (e.g., which net or net segments are connected to the symbolic view, or which net or net segments are connected to corresponding ports of the symbolic view, etc.) to a non-native EDA tool. When an EDA tool encounters non-native design data, the EDA tool does not need to have any knowledge or even visibility of the actual, non-native design data (e.g., schematic instances, layout shapes, other design related information, etc.) because such actual design data may be processed, when needed or desired, by the corresponding EDA tools to which the actual design data are native.

In some embodiments, by referring to a data structure including, for example, design data and their respective layers, domains, hierarchical levels, and/or design fabrics, the method or system described herein may be made aware of which design fabric a design component belongs to, which EDA tools are to be invoked or instantiated to natively process the actual design data of the design component, the corresponding symbolic view of a design component or block, the source and destination of the request for action, details about the action in the request for action, prior manipulation or modification of the design component, or any combinations thereof.

Processing the multi-fabric electronic design may include the acts of implementing the multi-fabric electronic design in one or more design domains across multiple design fabrics, checking or verifying the multi-fabric electronic design in one or more design domains across multiple design fabrics, netlisting the multi-fabric electronic design across multiple design fabrics, probing the multi-fabric electronic design across multiple design fabrics, simulating the multi-fabric electronic design across multiple design fabrics, displaying the simulation results across multiple design fabrics, or any combinations thereof. Applicable design domains for various multi-fabric implementation techniques may include, for example, the register transfer level (RTL) domain, a schematic domain, a layout domain, etc.

It shall be noted that various techniques described herein may apply with full and equal effects to one or more layers (e.g., metal 1 layer, metal 2 layer, dielectric layer, etc.) and/or one or more hierarchical levels of a single- or multi-fabric electronic design (e.g., an IC design, an IC package design, a PCB design, a test bench design, etc.) in various embodiments. For example, various multi-fabric implementation or processing techniques may apply with full and equal force and effects to a test bench design including two identical or different printed circuit designs each comprising a plurality of same or different IC package designs and a plurality of other circuit components (e.g., PCB traces or other circuit components together with the plurality of IC package designs on each PCB design).

At 204A, the method or system may identify second design data in response to a request for action that are automatically transmitted from the first session of the first EDA tool. The first session of the first EDA tool may automatically transmit the request for action when receiving the request for processing the multi-fabric electronic design in some embodiments. In some of these embodiments, the first session of the first EDA tool may automatically transmit the request for action when encountering the second design data that are non-native to the first EDA tool. In some embodiments, the request for action may be accompanied by information that is pertinent to the request for processing the multi-fabric electronic design in addition to, for example, a command or script to instantiate or cause to instantiate a session of a second EDA tool that may natively process the second design data in some embodiments.

In these embodiments, the second design data are native to the second EDA tool and area non-native to the first EDA tool of 202A. The second design data may be pertinent to the request for processing the multi-fabric electronic design when the second design data in a different design fabric from the first design data are needed to complete the request for processing the multi-fabric electronic design in some embodiments. For example, the method or system may receive a request for netlisting a multi-fabric electronic design that includes an IC packaging design fabric including the design data for the IC packaging and an IC design fabric including the design data for the die. In this example, the method may identify a source (e.g., a port) for a net in the IC packaging design fabric, identify the net segments of the multi-fabric electronic design in the packaging design fabric, and identify the interface components between the IC packaging design fabric and the IC design fabric.

These identified net segments in the IC packaging design fabric may be identified for the netlist of the entire design including the IC packaging and the die. The information pertinent to the request for processing the multi-fabric electronic design in this example may thus include design data (e.g., schematic design data or layout design data) in the IC design fabric which may include one or more hierarchical levels, depending upon whether the IC design for the die has a flat structure or a hierarchical structure. In some embodiments, the second design data and the first design data may be stored in the same database or even the same library file. In some other embodiments, the second design data and the first design data may be stored in separate databases or separate library files, although these separate databases or separate library files are nevertheless managed by the same first design data database system.

At 206A, the method or system may identify (if the representation already exists) or generate (if the representation does not exist) a representation for the second design data using the first session of the first EDA tool in some embodiments. The representation may include a symbolic view or symbolic representation for the second design data and includes the necessary connectivity information to facilitate the interconnection of the second design data with the corresponding portion of the first design data in some embodiments. In these embodiments, a symbolic view or representation may include one or more ports that connect to, for example, the respective circuit components (e.g., net(s) or net segment(s), pin(s), terminal(s), port(s), etc.) in the corresponding portion and are associated with or annotated or identified by the identifiers of the respective circuit components in the first design data.

For example, a symbolic view of a cell in a second design fabric may include the ports of the cell, and the ports of the cell may be associated with or annotated or identified by the respective identifiers of the respective net segments in the first design fabric and connected to these ports in some embodiments. In some other embodiments, a symbolic view may include the ports with the corresponding port identifiers (e.g., port or pin names). The symbolic view for the cell in the second design data may further include, for each port, a net segment with its identifier that may be recognized in or even common to both the first design fabric and the second design fabric, and the net segment or its identifier may further correspond to the net or net segment in the first design data that is connected to the cell. In these embodiments, different EDA tools natively processing different design data in different design fabrics may cross reference such identifiers to ensure that all circuit components are properly interconnected as designed.

In some embodiments, the second session of the second EDA tool may, upon its receipt of the request for action, transmit a return request for action to the first session of the first EDA tool. The return request for action may include, for example, the identifiers of one or more ports, pins, terminals, or pads (collectively port) in the second design data and their correlation with the corresponding circuit components (e.g., net(s), net segment(s), port(s), etc.) in the first design data. The first session of the first EDA tool may use such information in determining one or more symbolic views for the second design data to be displayed in the first session of the first EDA tool. In some embodiments, the second design data may include schematic data or layout data (or physical design data) of an electronic component design, the representation for the second design data may comprise a symbolic view of the electronic component design.

At 208A, the method or system may fulfill the request for processing the multi-fabric electronic design by continuing to process the content of the symbolic view using the second session of the second EDA tool and transmitting the processing results to the first session of the first EDA tool or to another EDA tool. In this manner, the method or system starts by using the first session of a first EDA tool to process first design data native to the first EDA tool, transmitting a request for action from the first session of the first EDA tool to a second session of a second EDA tool, and using the second session of the second EDA tool to process the second design data that are native to the second EDA tool but non-native to the first EDA tool.

In the aforementioned example of netlisting a multi-fabric electronic design including design data in both the packaging design fabric and the IC design fabric, the method or system may transmit the pertinent information including information about the interface components or connectivity from the IC package design tools to the EDA tools to which the IC design data are native. The method or system may then invoke an existing session of an IC design tool (e.g., a schematic editor or a layout editor) to determine the corresponding net segments in the IC design fabric based at least in part upon the pertinent information from the IC package design tools. The IC design tool may then use the pertinent information about the interface components or connectivity and determine the net segments in the IC design fabric and corresponding to the interface components or connectivity by using, for example, the corresponding connectivity information in the IC design fabric until all net segments for the net bridging the IC package design fabric and the IC design fabric have been determined. Information about these determined net segments may be used to, for example, construct a netlist for the multi-fabric electronic design, probing at least a portion of the multi-fabric electronic design, checking, testing, or verifying the multi-fabric electronic design, or simulating or analyzing the multi-fabric electronic design, etc. For netlisting a multi-fabric electronic design, the method or system may then repeat the same process for the remaining nets until all nets are similarly processed to complete the netlist for the multi-fabric electronic design.

It shall be noted that each EDA tool may use the connectivity information in the design fabric whose design data are native to the EDA tool but not the connectivity information in one or more other design fabrics whose design data are non-native to the EDA tool in some embodiments. A similar example where processing the multi-fabric electronic design includes implementing the multi-fabric electronic design. The method may use a packaging design tool to create or modify the packaging schematic up to a point where the packaging design interfaces with the die. For example, the method may connect a packaging pin to an IO (input, output, or ioput) pin of the die.

The method or system may provide the pertinent information including, for example, information about the interface elements (e.g., pins, pads, terminals, or interconnects connected to such pins, pads, or terminals) at or near the packaging-die interface to the IC design tool. The IC design tool may use such pertinent information to complete the design (e.g., by interconnecting the input pin with an output pin) in the IC design fabric and transmit at least a part of the results (e.g., a partial netlist including the input pin and the output pin) to the packaging design tool. In the packaging design tool, the IC design may be represented as a symbolic view that is linked with the actual design data (e.g., schematic or layout design data).

One of the symbolic view and the actual design data may be referenced, displayed, or processed when the other is referenced, displayed, or processed. In some embodiments, respective EDA tools associated with multiple deign fabrics do not operate on the same set of design data. Rather, EDA tools associated with a particular design fabric operate on the design data in the particular design fabric while the other design data non-native to these EDA tools are represented as one or more symbolic views in one or more domains in the first design fabric in some of these embodiments. In these embodiments, no EDA tool has the complete visibility or knowledge of the entire multi-fabric electronic design. In other words, no single EDA tool has or needs access to all the design data of the entire multi-fabric electronic design.

Processing native design data with the respective EDA tools provides the advantage of not having to generate two representations of the same set of design data for cross-probing any portion of a multi-fabric electronic design. Another advantage is that design data need not be protected by, for example, read-only access because no design data need to be shared between two EDA tools. This is in sharp contrast with some conventional, collaborative design environment where some design data are shared between two circuit design tools and thus need protection such as read-only access for the shared design data.

The read-only access to some design data hinders the ability of improve or optimize such design data within the context of design data in one or more other design fabrics. The read-only access to some design data hinders the ability of improve or optimize other design data within the context of the read-only protected design data. Using respective EDA tools to process their respective native design data also provides the advantage in that only the EDA tools responsible for creating, modifying, or maintaining the native design data have visibility of the native design data, while the other EDA tools only see a symbolic views or representations of such design data, instead of different representation of the same design data.

In these embodiments, design data of a circuit component exist in one and only one design fabric and are visible only to the EDA tools to which the design data are native. When encountering non-native design data, an EDA tool instantiates a symbol for the non-native design data and has no knowledge or visibility of the actual design data in these embodiments. When encountering such non-native design data, the EDA tool in fact does not need the knowledge or visibility of the actual, non-native design data because such actual design data will be processed by the corresponding EDA tools to which the actual design data are native. By referring to the data structure, the method or system can be made aware of which design fabric a design component belongs to, which EDA tool is to be invoked or instantiated to process the actual design data of the design component, the corresponding symbolic view of the design component, the source and destination of the request for action, details about the action in a request for action, prior manipulation or modification of the design component, or any combinations thereof.

In some embodiments, the method or system may further maintain state information of the multi-fabric electronic design by using a data structure (e.g., an occurrence tree). The data structure may store various information including the layers, hierarchical levels, domains (e.g., schematic domain, layout domain, etc.), and/or design fabrics of a circuit component and one or more identifiers (e.g., identifier of the circuit component, identifiers of one or more ports of the circuit component (if any), corresponding identifiers of one or more other circuit components (e.g., net segments) connected to the circuit component, one or more profiles including the circuit component, one or more symbolic views representing the portion of a multi-fabric electronic design including the circuit component, or any other suitable information.

The state information may also include other information including generation or modification of any part of the multi-fabric electronic design and/or correlations or correspondence between a design view (e.g., a cell view including schematic or layout design data) and a symbolic view and store such other information with or without the associated entities (e.g., the aforementioned cell view or symbolic view) in some embodiments. Some embodiments may also generate or identify a set of links (e.g., pointers, symbolic links, or any other suitable linking structures) between various pieces of information in the state information and one or more other pieces of information in the state information. For example, the method or system may identify or generate a link between a cell view including more detailed design data and its corresponding symbolic view including, for example, only the information sufficient to interconnect the symbolic view to other corresponding circuit components in a design fabric.

Figure 2B:
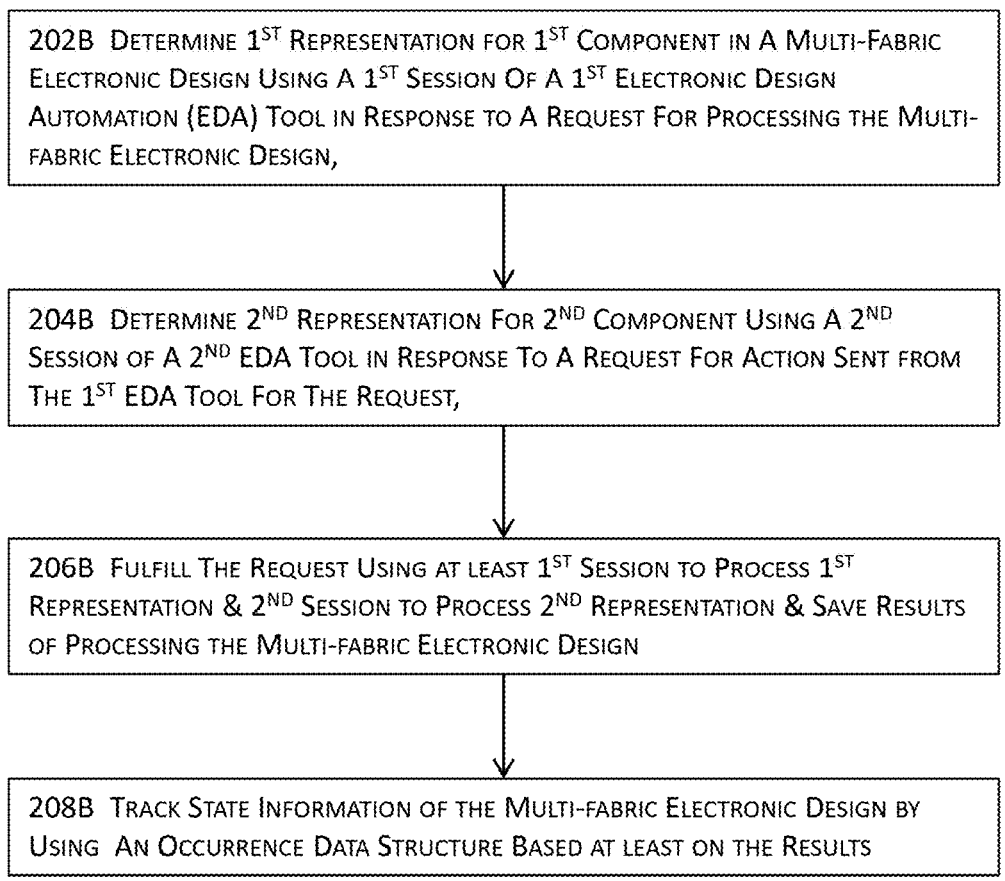
FIG. 2B illustrates another high level block diagram of a system for implementing a multi-fabric electronic design across multiple design fabrics in some embodiments.

FIG. 2B illustrates another high level block diagram for a method or system for implementing a multi-fabric electronic design across multiple design fabrics in some embodiments. In these embodiments, the method or system may determine the first representation of a first component in a multi-fabric electronic design with a first session of a first EDA tool in response to a request for processing the multi-fabric electronic design at 202B. In some of these embodiments, the design data of the first component are native to the first EDA tool and non-native to the second EDA tool. The first representation of the first component may thus include a view of the component in the first EDA tool that is capable of natively manipulating the content (e.g., design data) of the first representation.

In some of these embodiments, the second EDA tool does not have access to complete connectivity in the first design fabric. In some of these immediately preceding embodiments, the second EDA tool only has access to the connectivity information in the first design fabric at the interface but not beyond the interface. For example, an IC packaging tool may have visibility of the connectivity information in the IC package design fabric up to the IO (input, output, or ioput) pins that are located at the interface between the IC packaging and the die and connect to the internal components of a die but not the connectivity information beyond these IO pins in some embodiments.

The IC design tool, on the other hand, may have the entire connectivity information of the internal components of the die design up to the IO pins at the periphery of the IC die but not the connectivity information beyond these IO pins. For example, the IC design tool may not have any knowledge or visibility of the connectivity information in the IC packaging design fabric. On the other hand, the IC packaging design tool has the connectivity information about which IO pin of the die design is connected to which corresponding IO pin or net segment of the IC packaging design in some embodiments. In some embodiments where the first component is situated in a first design fabric including IC design data, the first representation determined at 202B may include, for example, a netlist or one or more listings of net segments of a net or a part of a net.

At 204B, the method or system may determine a second representation for a second component in a second design fabric using the first session of the first EDA tool or a second session of a second EDA tool in response to a request for action (e.g., a message or an inter-process communication, etc.) that is sent from the first session of the first EDA tool for the request for processing the multi-fabric electronic design. In some embodiments where the first session determines the second representation, the first EDA tool may determine the second representation as a symbolic representation or view for the second design component. For example, an IC packaging design tool may determine a symbolic view for an IC die design including IC design data that are non-native to the IC packaging design tool. The first EDA tool may determine the second representation to include the corresponding connectivity information (e.g., net name(s), pin name(s), etc.) so that the second representation may be properly interconnected in the multi-fabric electronic design in the first design fabric.

In some embodiments where the second session determines the second representation, the second EDA tool may determine a cell view or representation for the second design component. The second EDA tool may further associate at least some of the pertinent information transmitted from the first EDA tool with the cell view or representation. In some embodiments, the second EDA tool, rather than the first EDA tool, may also create a symbolic view for the second design data although the second EDA tool may natively manipulate the second design data. In these embodiments, the second EDA tool may also associate at least some of the pertinent information (e.g., the net name(s)) transmitted from the first EDA tool and/or the connectivity information internal to the second design data (e.g., the identifiers of one or more net segments internal to the second design data) with the symbolic view for the second design data and return the symbolic view to the first session of the first EDA tool via a return request for action such that the first session of the first EDA tool may properly connect the symbolic view of the second design data in the first design fabric.

In some embodiments, the second EDA tool may further associate the cell view or representation with the corresponding symbolic view by, for example, updating a data structure (e.g., an occurrence tree) to associate the cell view with the corresponding symbolic representation. For example, an IC design tool may determine a cell view for an IC die design including IC design data that are native to the IC design tool and may further associate the cell view with the symbolic view. In these embodiments illustrated in FIG. 2B, a circuit design may be represented as a symbolic view in one or more design fabrics whose associated EDA tools are not capable of natively manipulating the design data of the circuit design. The same design may be represented as, for example, a cell view in a design fabric whose associated EDA tools are capable of natively manipulating the design data of the circuit design. A symbolic view of a circuit design in a design fabric may be created by either the EDA tools that are associated with the design fabric and are capable of natively manipulating the design data or by other EDA tools to which the design data of the circuit design are non-native.

The second representation may include a netlist of or associated with the second component in the second design fabric and may be generated by the second EDA tool, instead of the first EDA tool or a third tool. In some of these embodiments, the request for action may also include the interface information across the two design fabrics. The request for action may also include one or more processes or invoke the one or more other processes to transform, map, export, or abstract design data into a common format or a unified format (e.g., a SPICE or Simulation Program with Integrated Circuit Emphasis netlist). It shall be noted that the first session and the second session may be separately invoked or instantiated on demand and need not coexist at the same time although these two sessions may certainly coexist concurrently in some embodiments. The first session and the second session may be the same session in some embodiments, but they need not be.

At 206B, the method or system may fulfill the request for processing the multi-fabric electronic design by using at least the first representation and the second representation and save the processing results in a non-transitory computer readable storage medium or a storage device. In some of these embodiments, the method or system may need to combine the first representation and the second representation. In these embodiments, the first representation used by the second session of the second EDA tool includes a symbolic representation of the first design data into which the second EDA tool has no visibility. In some embodiments, the first representation and the second representation, although from two different design fabrics, may be respectively generated to have a common format such that the first representation and the second representation may be subsequently combined. For example, the first EDA tool may generate the first representation as a first partial netlist of a multi-fabric electronic design, and the second EDA tool may generate the second representation as a second partial netlist of a multi-fabric electronic design. In this example, the method or system may combine the first and second representations at 206B to generate a more complete netlist in some embodiments.

At 208B, the method or system may track state information of the multi-fabric electronic design by using a data structure (e.g., an occurrence tree) based at least in part upon the results of processing the electronic design in some embodiments. With such data structures, the method or system knows that a selected node needs to be rooted from the top level of the multi-fabric electronic design when one node in any design fabric is selected. The method may also track other information including generation or modification of any part of the multi-fabric electronic design and/or correlations or correspondence between a design view (e.g., a cell view including schematic or layout design data) and a symbolic view and store such other information with or without the associated entities (e.g., the aforementioned cell view or symbolic view) in some embodiments. In some of these embodiments, the method may also provide links (e.g., pointers, symbolic links, or any other suitable linking structures) for the tracked information (e.g., links between a cell view and its corresponding symbolic view).

Figure 2C:
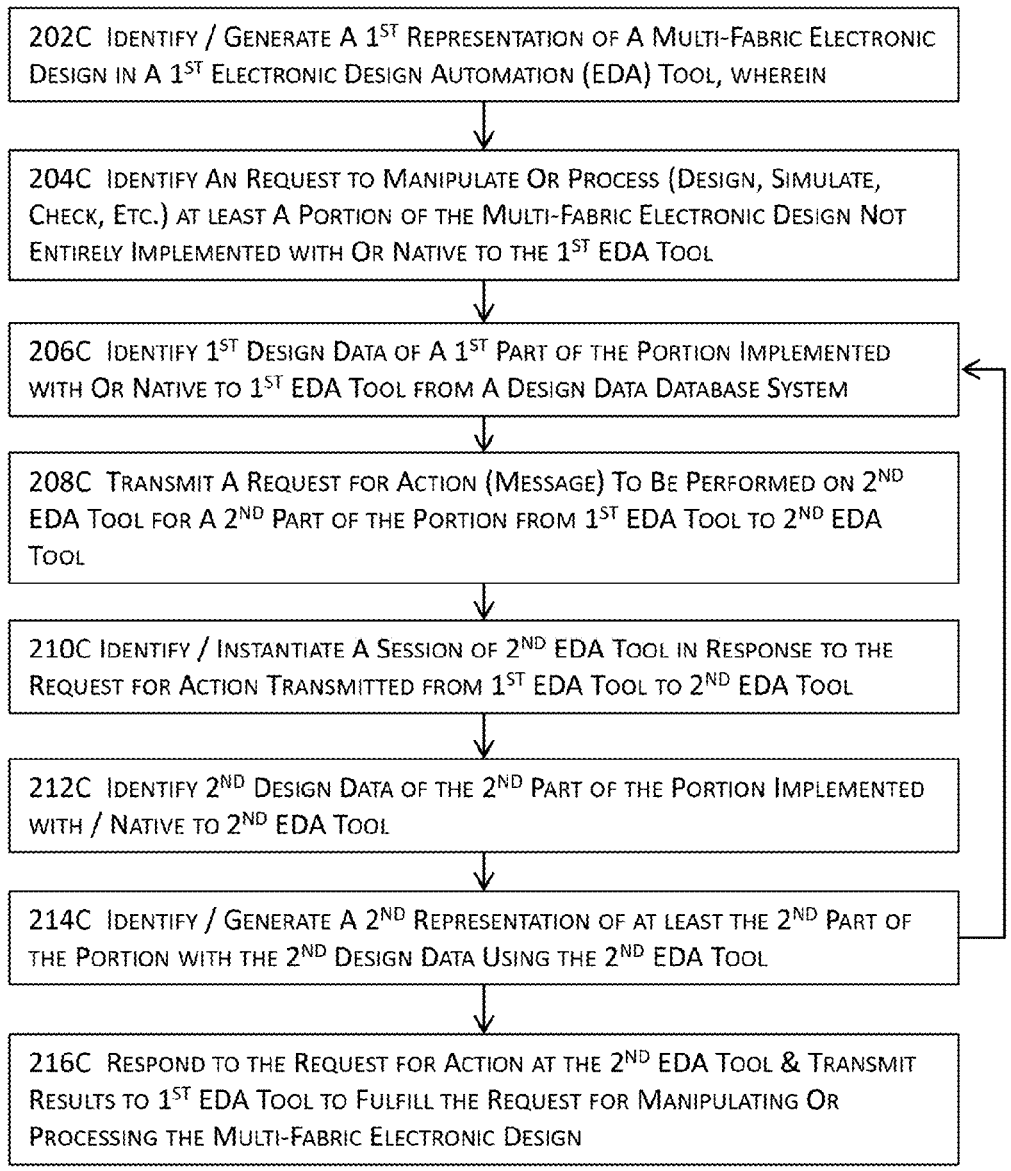
FIG. 2C illustrates a more detailed block diagram of a system for implementing a multi-fabric electronic design across multiple design fabrics in some embodiments.

FIG. 2C illustrates a more detailed block diagram for implementing a multi-fabric electronic design across multiple design fabrics in some embodiments. In these embodiments illustrated in FIG. 2C, the method or system may identify or generate a first representation for a first component in a multi-fabric electronic design using a first session (or a second session of a second EDA tool) of a first EDA tool in response to a request for processing the multi-fabric electronic design at 202C. As described above with reference to FIG. 2B, any EDA tools may be used to generate a symbolic view of a circuit design, but an EDA tool may generate a cell view only when the EDA tool may natively manipulate the design data corresponding to or in the cell view.

In some of these illustrated embodiments, the first design data of the first component are native to the first EDA tool and non-native to a second EDA tool. For example, an IC packaging design tool may natively manipulate first design data in the IC packaging design fabric but not the second design data in the IC design fabric; and an IC design tool may natively manipulate second design data in the IC design fabric but not the first design data in the IC packaging design fabric. In some of these embodiments, the second EDA tool does not have complete connectivity information, which describes how nodes in the electronic design are connected to other corresponding nodes. In some of these embodiments, the first design data of the first component are native to the first EDA tool and are non-native to a second EDA tool.

Design data are native to an EDA tool if the EDA tool may be used to generate, access, and/or maintain the design data without performing any transformation, mapping, export, or abstraction (collectively transform or transformation) on the design data in some embodiments. In some of these embodiments, only design data that are native to an EDA tool are visible to and accessible by the EDA tool. On the other hand, design data are non-native to an EDA tool if the EDA tool cannot access the design data without performing some transformation, exportation, or mapping on the design data. In some of these embodiments, design data that are non-native to an EDA tool are invisible to and hence inaccessible by the EDA tool.

In these embodiments, the multi-fabric electronic design includes a printed circuit board level design in the first design fabric, an integrated circuit (IC) packaging design in a second design fabric, and an integrated circuit design in a third design fabric. Moreover, the first design data of the multi-fabric electronic design may include a cell view (e.g., a test bench schematic view) including the schematic designs of the test bench. The first design data may further include a symbolic view of a printed circuit board for the electronic design as well as a symbolic view of an integrated circuit design.

The first representation may include a hierarchy having multiple hierarchical levels where the test bench design is at a higher hierarchical level, the symbolic view of the printed circuit board may be situated at a first lower hierarchical level under the higher hierarchical level, and the symbolic view of the integrated circuit design may be further situated at an even lower second lower hierarchical level under the first lower hierarchical level in some embodiments. In these embodiments, the printed circuit board is represented symbolically in the test bench design and includes a symbolic representation that occupies a designated space in the test bench design. The symbolic representation or a symbolic view of the printed circuit board may also include some interface information (e.g., identifiers or other information about interconnects between the PCB and one or more external components that are external to the PCB) in some of these embodiments.

It shall be noted that the multi-fabric electronic design may not be a complete design missing at least one component in the design or may even exhibit some verification errors or design rule checking violations. As some of the illustrated embodiments show, some of these embodiments are directed at processing and implementing an incomplete electronic design to completion, and some other embodiments are directed at verifying or checking a multi-fabric electronic design (e.g., by checking whether a symbolic view and the corresponding cell view have the same terminal(s), the same terminal direction(s), the same terminal constraint(s), the same terminal power sensitivity, etc.)

It shall be further noted that the term "symbolic view" and "symbolic representation" may be used interchangeably throughout the application, unless otherwise specifically recited or claimed. The symbolic representation of the printed circuit board may also include some electrical data, characteristics, or parasitics (e.g., power, voltages, currents, resistances, etc.) and/or some physical data or characteristics (e.g., temperature, thermal resistance, thermal RC circuits, etc.) such that the test bench design may be edited, analyzed, and/or simulated in the electrical domain, the physical domain (e.g., the thermal domain), or both the electrical and physical domains. In some embodiments, the first representation may be generated or identified for an EDA tool that may include, for example, at least one of an integrated circuit schematic design tool, an integrated circuit physical design tool, and an integrated circuit design simulation tool. In some of these embodiments where the first representation already exists, the method or system may identify the existing, first representation. In some other embodiments where the first representation does not exist, the method or system may generate the first representation.

At 204C, the method or system may identify a request to manipulate or process at least a portion of the multi-fabric electronic design with the first EDA tool that is not capable of natively manipulating the entire design data in the at least a portion of the multi-fabric electronic design. The request may be initiated by a user or a system while performing other tasks; and the request to manipulate or process the multi-fabric electronic design may include a request to netlist, to probe, to analyze, to simulate, or to check, test, or verify the multi-fabric electronic design.

Other than determining a second representation for a second component with the first EDA tool as described in FIG. 2B, the method or system may determine the second representation for the second component of the multi-fabric electronic design by using a second session of a second EDA tool in response to a request for action (e.g., a message or an inter-process communication or IPC, etc.) that is transmitted from the first session of the first EDA tool to the second session of the second EDA tool at 204C in some embodiments. In some of these embodiments, the design data of the second component are native to the second EDA tool and are non-native to the first EDA tool.

In some of these embodiments, the second EDA tool does not have complete connectivity information, which describes how nodes (e.g., pins, pads, terminals, etc.) are connected to other corresponding nodes in the multi-fabric electronic design. In some of these embodiments, no single EDA tool in the multi-fabric design environment has the complete connectivity information or the complete knowledge of the entire multi-fabric electronic design. Rather, each EDA tool is responsible for and thus processes only the design data that are native to the EDA tool. In some of these embodiments, an EDA tool only processes some or all design data in a single design fabric. For example, a layout editor processes the design data of a layout in the IC (integrated circuit) design fabric; and a schematic editor processes the design data of a schematic in the IC design fabric.

The method or system may also identify an input to the multi-fabric electronic design to manipulate at least a portion of the multi-fabric electronic design on the first EDA tool at 204C. An input may comprise any forms of input to the test bench that range from a simple click in the display area showing the portion to a script or program code including multiple lines of instructions. The input may thus be interactive in some embodiments or in a batch mode in some other embodiments. In some of these embodiments, manipulating a portion of an electronic design may include modifying the electronic design by adding one or more components to the electronic design, removing one or more components from the electronic design, or modifying one or more existing components in the electronic design.

Manipulating a portion of an electronic design may include simulating the electronic design in the electrical domain, the physical domain, or both the electrical and the physical domains. Manipulating a portion of an electronic design may also include checking or verifying the electronic design to determine whether the electronic design satisfies one or more design rules, constraints, requirements, or preferences (hereinafter "requirements" collectively). In some of these embodiments, the multi-fabric electronic design is not entirely implemented or completed on the first EDA tool. In these embodiments, the multi-fabric electronic design is incomplete and may thus fail, for example, a layout versus schematic (LVS) check.

The processing or manipulation of the multi-fabric electronic design may including implementing the multi-fabric electronic design across multiple design fabrics, testing, checking, or verifying the multi-fabric electronic design across multiple design fabrics, netlisting the multi-fabric electronic design across multiple design fabrics, probing the multi-fabric electronic design across multiple design fabrics, simulating the multi-fabric electronic design across multiple design fabrics, displaying the simulation results across multiple design fabrics, or any combinations thereof.

The method or system may further identify first design data of a first part of the at least a portion of the multi-fabric electronic design at 206C, wherein the first design data are native to the first EDA tool. In some embodiments, the first design data may include IC design schematic data, layout data, or other physical data that may be used for manufacturing the IC design or for determining the manufacturability, performance, and/or reliability of the IC design. In these embodiments, the first design data may be identified from a design database that is administered and managed by a design database system which not only administers and manages the IC design data but also the various views (e.g., schematic view, layout view, symbolic view, etc.) and the design data of the electronic design in other fabrics (e.g., the first fabric for the printed circuit board and the second fabric for the IC packaging), although the design data in different fabrics may be stored in separate library files that are managed and administered by the same design database system.

At 208C, the method or system may transmit a request for action from a first session of the first EDA tool to the second session of the second EDA tool. In some embodiments, the request for action may identify (if the second session already exists) or instantiate (if the second session does not exist) a second EDA tool instance. For example, the method or system may transmit a request for action from a test bench design tool to identify or instantiate a PCB design tool or an IC packaging design tool at 208C. In some of these embodiments, the request for action may comprise a message that is transmitted from the first EDA tool to the second EDA tool. The request may also include or be accompanied by one or more identifications of views (e.g., one or more schematic views, one or more symbolic views, etc.) in some of these embodiments.

Depending upon the types of actions in the requests, the request may also include or be accompanied by one or more terminals, pins, pads, ports, or any interface information, etc. For example, the request for action may include a request to probe a net that starts from, for example, a power rail at the test bench level through the printed circuit board, into an IC packaging, and ends at a location within an integrated circuit design. The first EDA tool (e.g., an IC schematic design tool) may identify or instantiate the second EDA tool instance (e.g., a printed circuit board design tool) in response to an input to probe the aforementioned net because probing the net needs to cross the interface of the printed circuit board to continue the probing for the net. The method or system may identify or instantiate a second session of a second EDA tool in response to the request for action that is transmitted from the first session at 210C. In some embodiments where the second session of the second EDA tool already exists, the method or system may identify the existing second session of the second EDA tool at 210C. In some other embodiments where the instance of the second EDA tool does not yet exist, the method or system may invoke the second EDA tool by instantiating an instance of the second EDA call via, for example, a system call at 210C.

At 212C, the method or system may identify a second design data of the second part of the portion that is implemented with or native to the second EDA tool in some embodiments. In some embodiments, the method or system may identify a second design data from the same design data database from which the first design data are identified at 206C. As described earlier, design databases of various views, data, etc. for the multiple fabrics are administered and managed by a design database system that not only administers and manages the IC design data but also the various views (e.g., schematic view, layout view, symbolic view, etc.) and the design data of the electronic design in other fabrics (e.g., the first fabric for the printed circuit board and the second fabric for the IC packaging), although the design data in different fabrics may be stored in separate library files that are managed and administered by the same design database system. In some of these embodiments, the second design data include, for example, printed circuit board design data or IC packaging design data. The design data may include information about, for example, connectivity, nets, netlist, physical design data, electrical design data, parasitics associated with the physical design data, or any combinations thereof, etc.

At 214C, the method or system may further identify or generate a second representation of at least the second part of the portion with the second design data by using the second EDA tool in some embodiments. In some of these embodiments, the second representation may include, for example, a schematic or layout representation of the printed circuit board, or a schematic or layout representation of the IC packaging design. In these embodiments, the second EDA tool generates a cell view as the second EDA tool. For example, the second representation may constitute a schematic representation of the printed circuit board design. The second representation may thus include the schematic level design data of the printed circuit board design that may be edited with the PCB design tool (the second EDA tool).

The printed circuit board design may nevertheless be represented on the IC schematic design tool (the first EDA tool) as a symbolic view. In this example, the IC schematic design tool (the first EDA tool) manipulates the IC designs in the test bench and invokes the PCB design tool to manipulate the printed circuit board designs, while the IC schematic design tool (the first EDA tool) natively manipulates only the design data that it manipulates as well as the symbolic view of the printed circuit board or other symbolic views of other design components (e.g., IC packaging designs) that are to be manipulated by their respective EDA design tool(s). As described in FIG. 2B, the first EDA tool, although not capable of natively manipulating the second design data, may also generate the second representation of the second design data. In these embodiments, the first EDA tool (or other non-native EDA tools) may generate a symbolic view for the second design data.

At 216C, the method or system may respond to the request for action by using at least the second EDA tool. Upon or shortly after the completion of the one or more actions associated with the request for action, the second EDA tool may also transmit the results of these one or more actions back to the first EDA tool at 216C, and the first EDA tool may further include at least a part of the results in its response to the request to process or manipulate the multi-fabric electronic design.

In the aforementioned example of probing a net starting at a first location in the test bench and ending at a second location within an IC design, the method or system may identify or generate a first representation of the test bench in an IC schematic design tool, receive a request for probing the net, and instantiate or identify an instance of a printed circuit board design tool to continue to probe the net that crosses the boundary of the PCB from the test bench. In this example, the method or system may then continue to use the PCB design tool to continue to probe the net until the net reaches the boundary of the IC packaging. The method or system may then identify or instantiate the IC packaging design tool which continues to probe the net within the IC packaging until the net is to cross the boundary of the IC design. The instance or session of the IC design tool may be identified or instantiated to continue to probe the net within the IC design. The probing results from the PCB design tool and the IC packaging design tool may be transmitted back to the IC design tool to fulfill the request for action—probing the net—in this example.

Figure 2D:
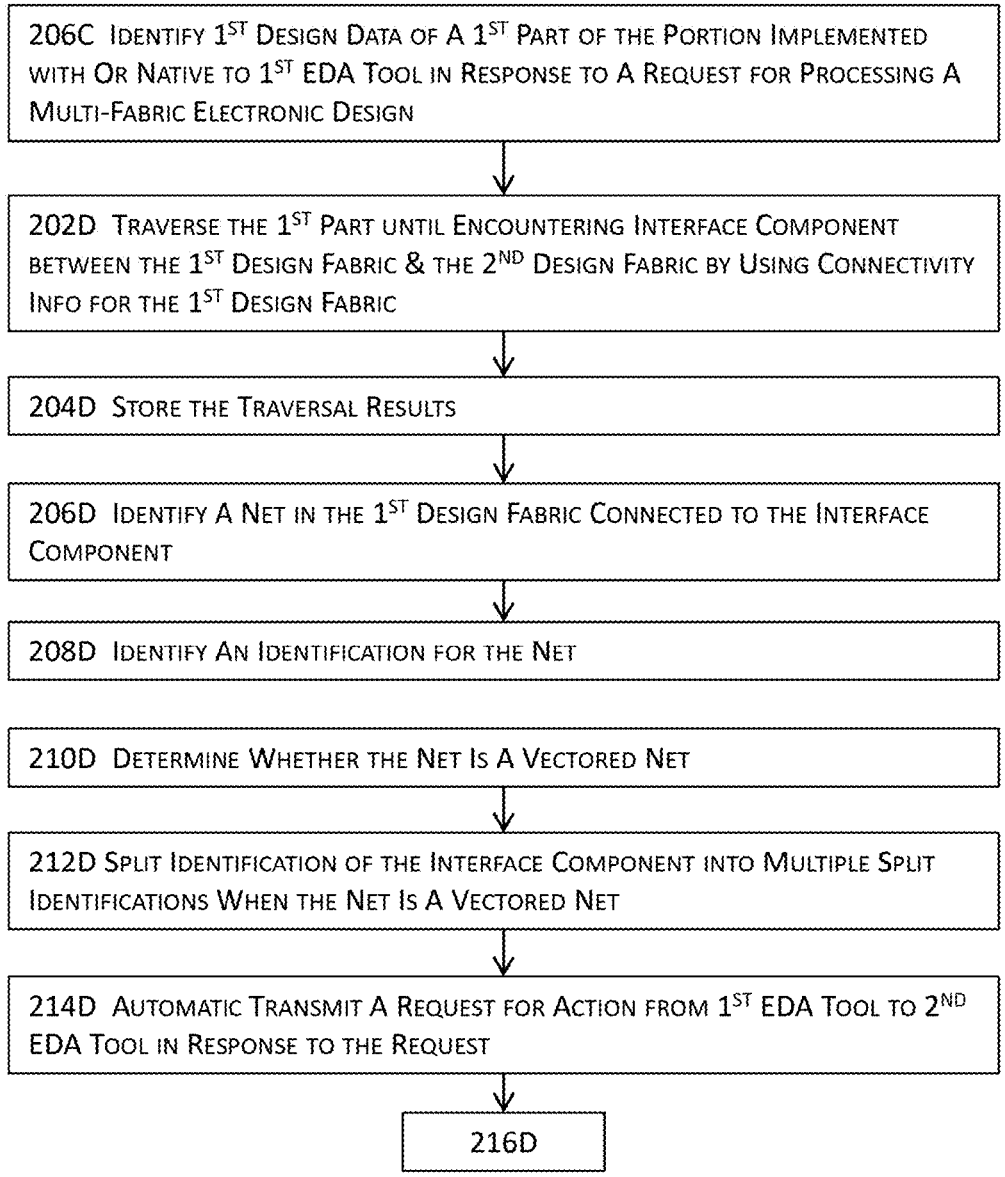
FIGS. 2D-E jointly illustrate a more detailed block diagram of a system for implementing a multi-fabric electronic design across multiple design fabrics in some embodiments.
Figure 2E:
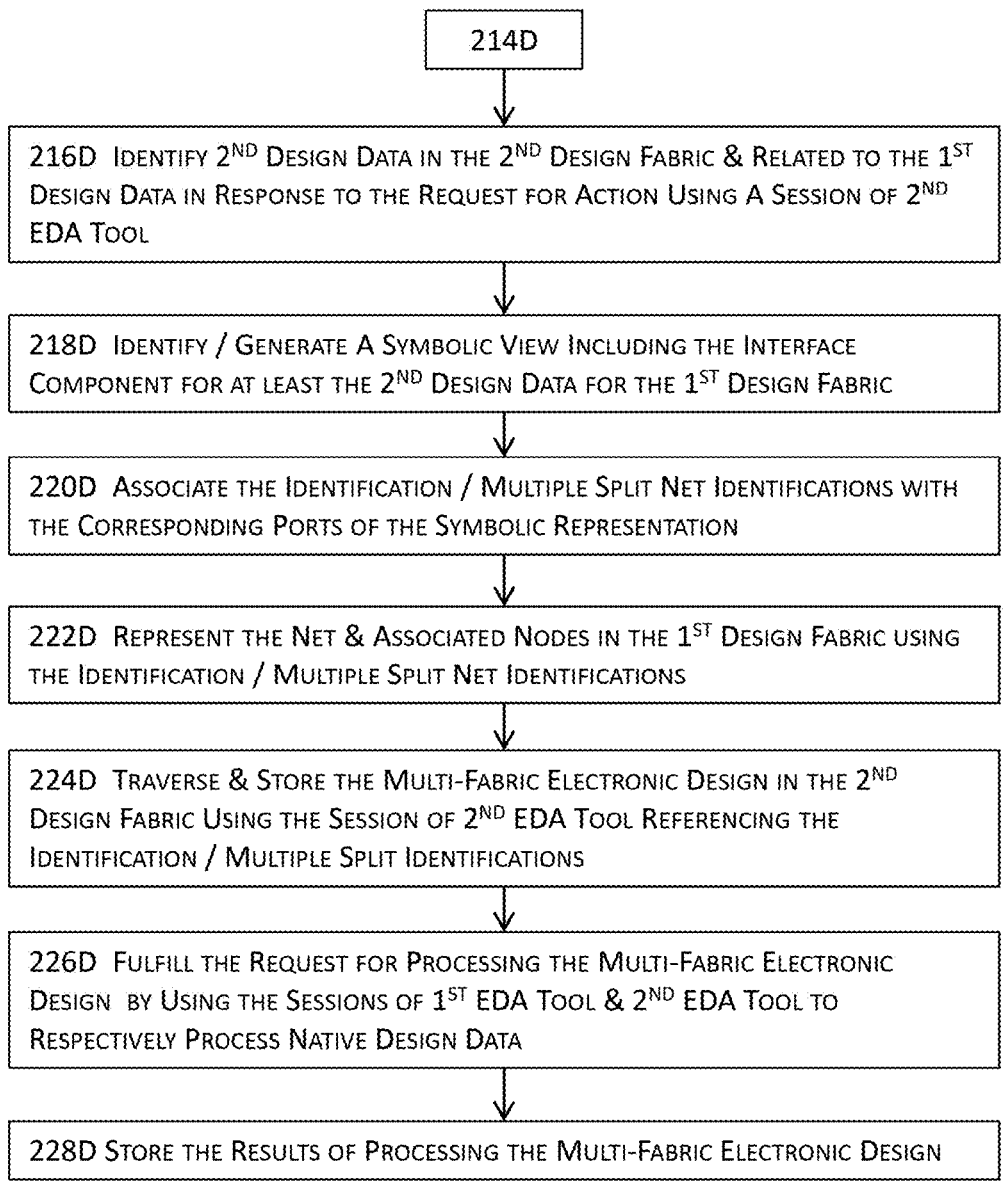

FIGS. 2D-E jointly illustrate a more detailed block diagram for implementing a multi-fabric electronic design across multiple design fabrics in some embodiments. In these embodiments illustrated in FIG. 2D-E, the method or system may first identify first design data of a first part of a portion implemented with or native to a first EDA tool in response to a request for processing a multi-fabric electronic design at 206C as described above with reference to FIG. 2C. The method or system may further traverse the multi-fabric electronic design in the first part until a boundary of the first design fabric or one or more interface components (e.g., a net segment in a PCB design and connected to a pin of an IC design) between the first design fabric and the second design fabric at 202D.

In some embodiments, the method or system may traverse the multi-fabric electronic design by using connectivity information for the first design fabric. At 204D, the method or system may store the traversal results as well as the information about the boundary or the one or more interface components. For example, the method or system may receive a request to netlist a multi-fabric PCB design including at least an IC design and an IC packaging design. The method or system may traverse the PCB design in the PCB design fabric to identify and store the net segments in a netlist. At 206D, the method or system may identify a net that is situated in the first design fabric and connected to an interface component. For example, the method or system may identify a net in a PCB design and traverse the net until the method or system encounters a pin in an IC packaging design.

At 208D, the method or system may identify an identification for the net. An identification may include the name or any suitable identifier of the net that may be used to distinguish the net from other nets. The method or system may also identify the source and/or the destination for the net at 208D. For example, in identifying and traversing the net, the method or system may also identify the source pin identifier and the destination pin identifier for the net although the net may be connecting circuit components in two different design fabrics. In this example, the source and destination of a net may be identified by the EDA tools that may access the respective native design data in these two different design fabrics. For example, the method or system may use the PCB design tool to identify the source pin name of a net in the PCB design fabric and an IC packaging design tool to identify the destination pin name of the destination pin in the IC packaging design. At 210D, the method or system may determine whether the net is a vectored net or a scalared net.

In some embodiments where the method or system determines that the net is a vectored net, the method or system may connect one or more ports of a circuit component (e.g., a cell or block of circuit components) to the vectored net by using one or more vectored net identifications that correspond to the one or more ports. For example, the method or system may identify (if pre-existing) or create (if non-existing) net name variants (e.g., a common net name as a prefix and a bit number as a suffix for each pin) on each of the one or more pins of a cell to appropriately connect the cell to a vectored net.

At 212D, the method or system may split the net identification for the net and/or the identification of the interface component into multiple split identifications when the net is determined to be a vectored net. In these embodiments, the method or system splits the identification of the vectored net into the corresponding net name variants and uses these net name variants to facilitate proper interconnections of circuit components. Depending on how the vectored net is connected to its destination, the method or system may similarly the identification of the interface component into multiple split identifications. This technique for splitting a net identification may be leveraged to properly interconnect a symbolic view to other detailed design data.

In some embodiments, the one or more vectored net identifications may include one or more names, numbers, or identifiers of the net. More details about representing nets and ports with identifiers are described in U.S. patent application Ser. No. 14/503,408 filed concurrently and entitled "METHODS, SYSTEMS, AND ARTICLES OF MANUFACTURE FOR BACK ANNOTATING AND VISUALIZING PARASITIC MODELS OF ELECTRONIC DESIGNS", the content of which is hereby expressly incorporated by reference for all purposes. At 214D, a request for action may be automatically transmitted from the first EDA tool to the second EDA tool. The request for action may be used to identify an existing session or instantiate a new session of the second EDA tool. In some embodiments, the request for action may be transmitted prior to or at the time when the first session of the first EDA tool encounters the second design data. At 216D, the method or system may identify the second design data in the second design fabric that are related to the first design data in response to the request for action by using the second session of the second EDA tool. The act 216D may be performed in identical or substantially similar manners as those described for 204A of FIG. 2A, 204B of FIG. 2B or 212C of FIG. 2C.

At 218D, the method or system may identify (if already existing) or generate (if non-existing) a symbolic view that includes the interface component for at least the second design data and is to be represented in the first design fabric. As described above, the symbolic view for the second design data may be generated by either the first EDA tool or the second EDA tool, although a cell view for the second design data may only be generated by the second EDA tool that is capable of natively manipulating the second design data. Further, depending on which EDA tool is to generate the second symbolic view, different pieces of information may be passed between the first EDA tool and the second EDA tool.

For example, the first EDA tool may transmit the connectivity information internal to the first design fabric (e.g., net names in the first design data and connected to the pins in the second design data) to the second EDA tool when the first EDA tool is to generate the symbolic representation of the second design data which are native to the second EDA tool and non-native to the first EDA tool. As another example, the second EDA tool may transmit the connectivity information internal to the second EDA tool (e.g., pin names in the second design data and connected to the net segments in the first design data) to the first EDA tool when the second EDA tool is to generate the symbolic representation of the second design data.

At 220D, the method or system may represent the circuit components that are in the first design fabric and are situated at or near the boundary separating the first design fabric and the second design fabric. For example, the method or system may associated the appropriate identifications with the net segments and pins in the first design fabric as well as the corresponding pins in the second design fabric such that the first design data and the second design data in different design fabrics may be correctly interconnected. The net and the nodes associated with the net in the first design fabric may be represented at 222D by using the identification of the net or the multiple split net identifications. At 224D, the method or system may continue to traverse or process the multi-fabric electronic design in the portion defined by the second design data by using the second session of the second EDA tool.

In some embodiments, the method or system may continue the traversal or processing for the second design data by referencing at least the identification of the net (e.g., when the net is a scalared net) or the multiple split identifications of the net (e.g., when the net is a vectored net). In the above netlisting example where the method or system uses a PCB design tool to identify the net segments of a net in the PCB design fabric, the method or system may further use an IC packaging design tool to identify the corresponding net segments between the IC package and the enclosed IC die in the IC packaging design fabric and an IC design tool to identify the corresponding net segments inside the IC design fabric. Once these net segments for the net in the three design fabrics are identified, the method or system may update the netlist of the multi-fabric PCB design accordingly.

As another example where a user may probe a multi-fabric PCB design by, for example, clicking on a net segment in the PCB design fabric to identify, for example, the electrical and parasitic information associated with the net. The method or system may first use the PCB design tool to identify the circuit components of interest (e.g., net segments, nodes, pins, etc.) in the PCB design fabric, use the IC packaging design tool to identify the circuit components of interest in the IC packaging design fabric, and the IC design tool to identify the circuit components of interest in the IC design fabric. The method or system may thus identify a net of interest across multiple design fabrics and may further identify the electrical information or parasitic information that is related to the identified net to fulfill the request to probe the multi-fabric PCB design.

At 226D, the method or system may then fulfill the request for processing or manipulating the multi-fabric electronic design by using the first session and the second session to respectively process the native design data. The processing or manipulation results may further be stored at 228D. In some embodiments where a profile is associated with one or more symbolic views, the method or system may further associate the results with the profile for future reference or reuse. For example, the method or system may further include some input values or parameters for simulation in a profile associated with a symbolic view. In this example, the method or system may simulate the multi-fabric electronic design and associate the simulation results with the profile so that the simulation results may be subsequently reused for other purposes.

Figure 2F:
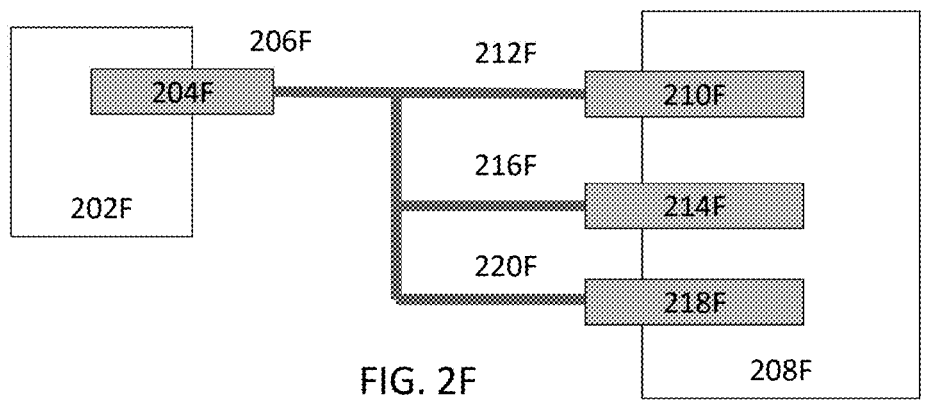
FIGS. 2F-H illustrate some simplified diagrams for using a symbolic representation to represent a non-native circuit block in different design fabrics in some embodiments.
Figure 2G:
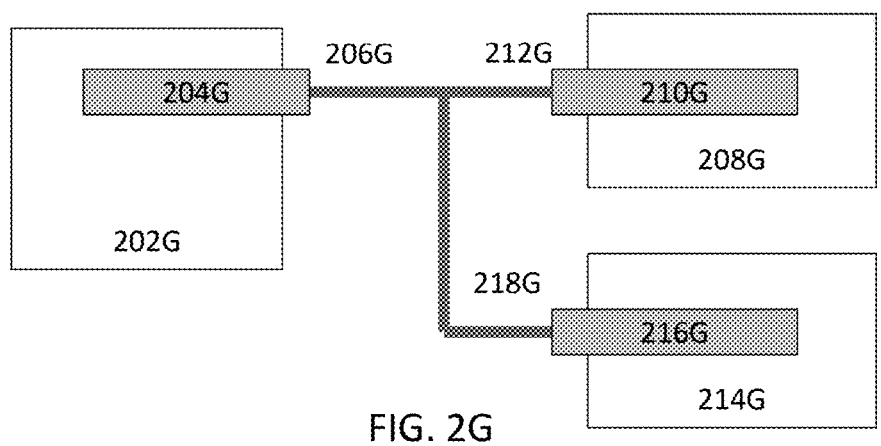
Figure 2H:
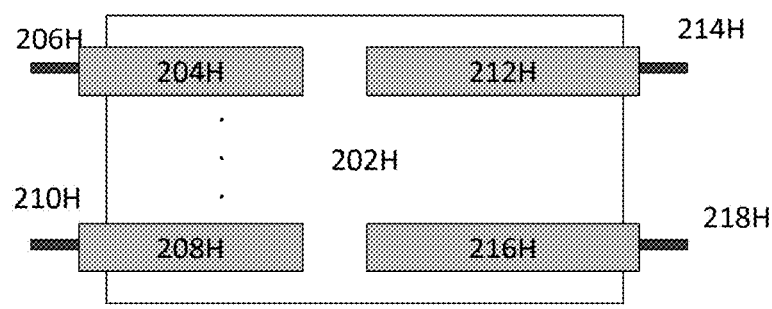

FIGS. 2F-H illustrate some simplified diagrams for using a symbolic representation to represent a non-native circuit block in different design fabrics in some embodiments. More specifically, FIG. 2G illustrates a simplified electronic design including a first design fabric (e.g., a PCB design fabric) and a second design fabric (e.g., an IC design fabric). In addition to one or more discrete device designs, the first design fabric may further include the vectored net 206F (e.g., net[2:0]) and the first cell 202F (e.g., the first IC design) that further comprises a first component 204F (e.g., die_pin_1) in a second design fabric. The first design fabric may further include the second cell 208F (e.g., a BGA or ball grid array design) that further comprises the first pin 210F (e.g., bga_pin_1), the second pin 214F (e.g., bga_pin_2), and the third pin (e.g., bga_pin_3).

The three BGA pins are respectively connected to the first scalared net 212F (e.g., net[0]), the second scalared net 216F (e.g., net[1]), and the third net (e.g., net[2]). In some embodiments where the method or system attempts to, for example, netlist the PCB design fabric as illustrated in FIG. 2G, the method or system may use a PCB design tool to identify the vectored net 206G and the three scalared nets 212F, 216F, and 220F. the method or system may further invoke the IC design tool to identify the net segments within 202F and 208F. Further, the first cell 202F and the second cell 208F may be represented as two symbolic views in the PCB design fabric where the PCB design tools have no visibility of the internal design data of the first and the second cells.

The method or system may, however, associate the pin names of the first cell and the second cell with respective net names in the PCB design fabric by using the techniques described above. Moreover, the method or system may invoke PCB design tool to split the vector net name of the vectored net 206F into multiple split net names that correspondingly connect to the scalared nets 212F, 216F, and 220F. For example, if the vectored net name of the vectored net 206F is net[2:0], the method or system may split the vectored net name into new_net[0], new_net[1], and new_net[2] that respectively connect to 212F, 216F, and 220F. It shall be noted that the IC packaging design fabric including the design data for the IC packaging for the first cell 202F and the second cell 208F is omitted in FIG. 2G for the ease of illustration and explanation. Nonetheless, an identical or substantially similar approach may be applied even when the illustrated multi-fabric electronic design includes more than two design fabrics.

FIG. 2H illustrates another simplified multi-fabric electronic design that includes two design fabrics—the first design fabric and the second design fabric. For the ease of explanation, the first design fabric denotes a PCB design fabric, and the second design fabric denotes an IC design fabric. It shall be noted that the IC packaging design fabric including the design data for the IC packaging is also omitted in FIG. 2H for the ease of illustration and explanation. In FIG. 2H, the first design fabric includes a first vectored net 206G (e.g., net[5:0]), the second vectored net 212G (e.g., net[2:0]), and a third vectored net 218G (e.g., net[5:3]). The first vectored net 206G is connected to both the second and the third vectored nets 212G and 218G.

The first design fabric further includes the first symbolic view 202G for a first IC design, the second symbolic view 208G for the second IC design, and the third symbolic view 214G for the third IC design. The first IC design 202G in the IC design fabric includes a first pin 204G (e.g., die_pin<5:0>) connected to the first vectored net 206G in the PCB design fabric. The second IC design 208G in the IC design fabric includes a second pin 210G connected to the second vectored net 212G in the PCB design fabric. The third IC design 214G in the IC design fabric includes a third pin 216G connected to the third vectored net 218G in the PCB design fabric. In some embodiments where the method or system attempts to, for example, netlist the multi-fabric electronic design illustrated in FIG. 2G, the method or system may invoke the PCB design tool to identify the first vectored net 206G, the second vectored net 212G, and the third vectored net 216G for the netlist.

The method or system may further invoke an IC design tool to identify the corresponding net segments in the three cells by using a request for action to invoke the IC design tool to identify the net segments in these three cells. For example, the method or system may invoke a request for action to instantiate an IC design tool session and transmit the net name (e.g., net[5:0]) for the first vectored net 206G in or with the request for action to the IC design tool session. The IC design tool session may reference the net name to identify the corresponding net segments in the first cell 202G.

In addition or in the alternative, the method or system, which has been made aware of the interconnection between the first vectored net 206G and the other two vectored nets 212G and 218G, may also split the net name for the first vectored net 206G into two split net names that respectively connect to the other two vectored nets 212G and 218G. For example, the method or system may split the net name "net [5:0]" into "new_net[5:3]" and "new_net[2:0]" that respectively connect to the other two vectored nets 212G and 218G. The method or system may also transmit the split net names in or with the request for action to the IC design tool to identify the corresponding net segments and add these corresponding net segments to the netlist accordingly.

FIG. 2I illustrates the use of a simplified representation 202H for the interconnecting net segments 206G, 212G, and 218G in some embodiments. More specifically, FIG. 2H illustrates splitting an identification and splitting a model representation (e.g., a representation of a net). In these embodiments, the net 206G (e.g., net[5:0]), 212G (e.g., net[2:0]), and 216G (e.g., net[5:3]) may be represented as the representation 202H that includes a first port 204H (e.g., DIE-die_pin[0]) connected to the net segment 206H (e.g., net[0]), a second port 208H (e.g., DIE-die_pin[5]) connected to the net segment 210H (e.g., net[5]) for the interconnections to the first cell 202G. The representation 202H may further includes the four additional pins (e.g., DIE-die_pin[1], DIE-die_pin[2], DIE-die_pin[3], and DIE-die_pin[4]] which are omitted for the ease of illustration and explanation.

On the side interfacing with the second net 212G and the third net 218G, the representation 202H may further include the third pin 212H (e.g., BGA-bga_pin[0]) connected to the net segment 214H (e.g., net_new[0]) an the fourth pin 216H (e.g., BGA-bga_pin[5]) connected to the net segment 218H (e.g., net_new[5]) to facilitate the interconnections to the second cell 208G and the third cell 216G. It shall also be noted that the representation 202H may also include the four additional pins (e.g., BGA-bga_pin[1], BGA-bga_pin[2], BGA-bga_pin[3], and BGA-bga_pin[4]) that respectively connect to the net segments (e.g., net_new[1], net_new[2], net_new[3], and net_new[4]) that are not shown for the ease of explanation and illustration. In these embodiments illustrated in FIG. 2I, the method or system splits the identifications and the representations of the circuit components (e.g., the nets). For example, FIG. 2I shows that the method or system splits the vectored net 206G with its own identification (e.g., net[5;0]) into multiple split net segments with their respective split identifications (e.g., net[0], net[5], etc.) The method or system also similarly split the nets 212G and 218G into multiple split net segments as described above.

Figure 3A:
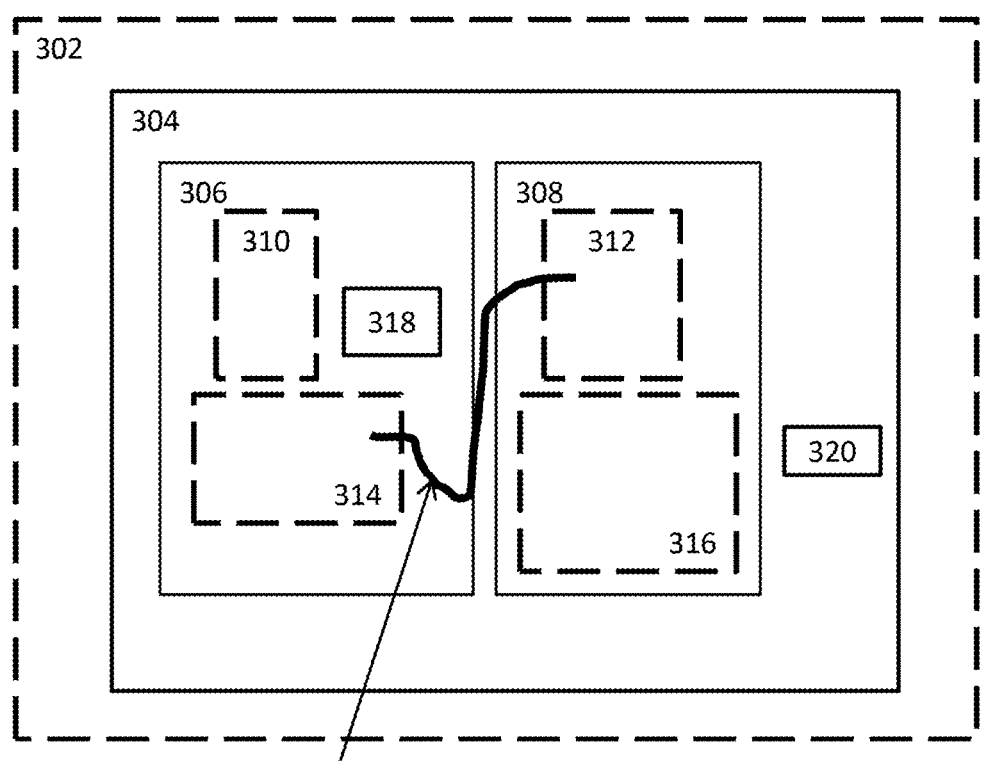
FIG. 3A illustrates a simplified schematic illustration of a multi-fabric electronic design in some embodiments.

FIG. 3A further illustrates that the printed circuit board design 304 in the test bench design fabric 302 includes an interconnect 350 to connect a first point within the second IC design 314 and a second point within the third IC design 312. The interconnect 350 crosses the boundary of the second IC design 314 in the IC design fabric, the boundary of the IC packaging design 306 in the IC packaging design fabric into the PCB design fabric, the boundary of IC packaging design 308 in the IC packaging design fabric, and the boundary of the third IC design 312 in the IC design fabric. The method or system may thus use various techniques described herein to process or manipulate the multi-fabric electronic design. For example, the method or system may use various techniques to netlist the multi-fabric electronic design for simulation. Once the cross-fabric simulation results are obtained, the method or system may display the simulation results for the interconnect 350 that spans across multiple design fabrics.

For example, the user may identify interconnect 350 by, for example, click on any part of the interconnect in any design fabric either in the graphic user interface showing the portion of the multi-fabric electronic design including the part of the interconnect or in an expandable and collapsible, textual tree structure of the multi-fabric electronic design in a hierarchical and/or fabric-specific manner. The user may further optionally specify what level of simulation results is to be retrieved or displayed for which part of the interconnect 350. As another example, the user may specify to see the simulation results for the interconnect segment of the interconnect 350 in only the PCB fabric or only the interconnect segment at the IC packaging design hierarchical level.

If the user does not specify the level of simulation results to be displayed, the method or system may retrieve and display the default level of simulation results. For example, the method or system may retrieve and display only the simulation results in the fabric and at the hierarchical level that correspond to the part of the interconnect being identified by the user in some embodiments. As another example, the method or system may retrieve and display the entire simulation results for the entire interconnect in all of the fabrics and all of the hierarchical levels across which the interconnect spans in some other embodiments. In response to the user's identification of the interconnect 350 and optionally on the user's specification of the level of simulation results, the method or system may identify appropriate connectivity information for the identified interconnect in the desired fabrics and/or at the desired hierarchical level, and use the appropriate connectivity information to retrieve the corresponding simulation results for display in a user interface.

In addition, the simplified representation of electronic design includes the test bench 302 at a first hierarchical level. The test bench 302 may further include a representation (e.g., a symbolic representation) of the printed circuit board 304 at a second hierarchical level. The test bench 302 may also include multiple interconnects from, for example, various power or ground rails to the printed circuit board 304. The printed circuit board 304 may also include a discrete component 320 situated at a third hierarchical level with the two IC packaging. The printed circuit board 304 may include the first IC packaging 306 and the second IC packaging 308 situated at a third hierarchical level, both of which may also be represented in one or more representations (e.g., a symbolic representation or schematic representation).

The first IC packaging 306 may include a second IC 314, a first IC 310, and a discrete component 318. The second IC packaging 308 may also include a third IC 312 and a fourth IC 316 situated at a fourth hierarchical level as the first IC 310 and the second IC 314. In some embodiments, one or more integrated circuit design EDA tools (e.g., an IC schematic editor, IC layout tool, etc.) may be used to generate, modify, or otherwise access the design data of the integrated circuit designs 310, 314, 312, and 316, whereas IC packaging design tools or printed circuit board design tools only receive symbolic representations of these integrated circuit designs. In these embodiments, IC packaging design tools may be used to generate, modify, or otherwise access the design data (e.g., schematic design data, physical design data, etc.) of the IC packaging designs 306 and 308, whereas the one or more integrated circuit design EDA tools and the printed circuit board design tools may only receive symbolic representations of the IC packaging 306 and 308.

In these embodiments illustrated in FIG. 3A, the printed circuit board design 304 also includes an interconnect that connects the second IC 314 and the third IC 312 across the boundaries of the first IC packaging 306 and the second IC packaging 308. Moreover, one or more printed circuit board design tools may be used to generate, modify, or otherwise access the design data (e.g., schematic or physical design data) of the printed circuit board, whereas the one or more IC design EDA tools and the IC packaging design tools may only receive a symbolic representation of the printed circuit board design.

The test bench design including the integrated circuit designs, the IC packaging designs, the printed circuit boards, one or more discrete components, and interconnections at the test bench level may be implemented in an integrated circuit design tool (e.g., an IC schematic tool for editing and/or simulating schematic designs of integrated circuit designs or for transmitting to and receiving from the physical designs, etc. or an IC layout tool for implementing or modifying layouts of or analyzing integrated circuit designs) because IC design tools have gone through extensive development and often includes various design environments or tools such as schematic editors, analog design tools, layout tools, RF design tools, various simulators (e.g., general purpose circuit simulation including SPICE or SPICE-like simulators, other digital simulators, other analog simulators, etc.) as well as various libraries. The EDA tools described herein may also be integrated with post-layout tools including, for example, verification and closure tools and may thus provide more functionalities and diverse capabilities than stand-alone printed circuit board design tools or IC packaging design tools.

Figure 3B:
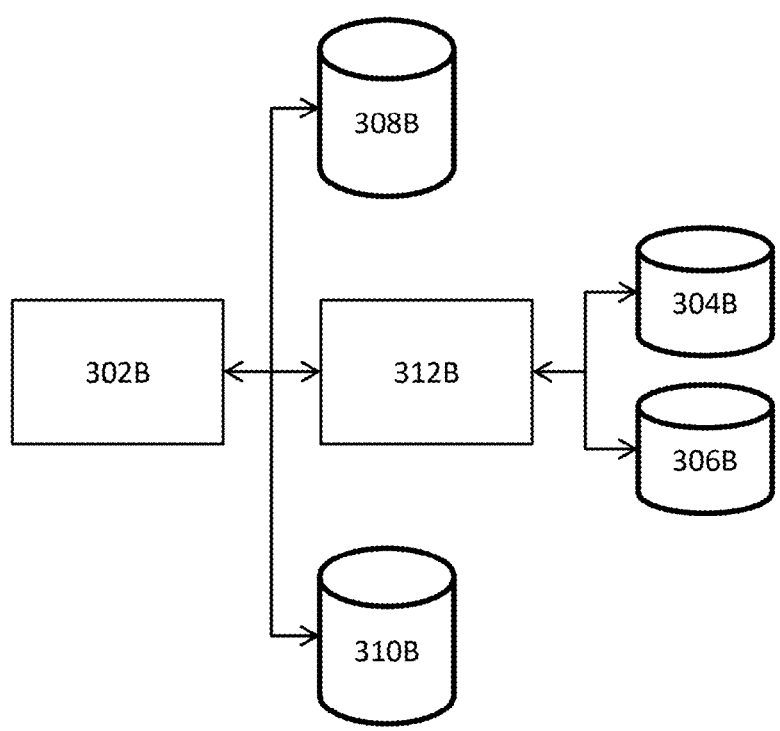
FIG. 3B illustrates a cluster of computing systems that may be used to implement various techniques and methodologies for a multi-fabric design environment described herein in some embodiments.

FIG. 3B illustrates a cluster of computing systems that may be used to implement various techniques and methodologies for a multi-fabric design environment described herein in some embodiments. The multi-fabric design environment may include the test bench fabric, the printed circuit board and packaging fabric, and the die fabric. In some of these embodiments, the multi-fabric design environment may include an IC packaging fabric and a printed circuit board fabric. The multi-fabric design environment may include one or more test bench design databases 308B in the test bench fabric, one or more IC design databases 310B in the die fabric, one or more IC packaging design databases 304B and one or more printed circuit board design data databases 306B in the fabric.

In some embodiments where the multi-fabric design environment includes a printed circuit board fabric and a separate IC packaging fabric, the multi-fabric design environment may include one or more IC packaging design data databases 304B in the IC packaging fabric and one or more PCB design data databases 306B in the PCB fabric. The multi-fabric design environment may further include one or more IC design tools (e.g., 302B) such as an IC schematic suite or an IC layout suite for manipulating the native schematic or physical design data of integrated circuit designs in the die fabric. The multi-fabric design environment may also include one or more PCB design tools (e.g., included in 312B) for manipulating the native schematic or physical design data of PCB designs in the PCB/IC packaging fabric or in the dedicated PCB fabric. The multi-fabric design environment may also include one or more IC packaging design tools (e.g., included in 312B) for manipulating the native schematic or physical design data of IC packaging designs in the PCB/IC packaging fabric or in the dedicated IC packaging fabric.

Figure 3C:
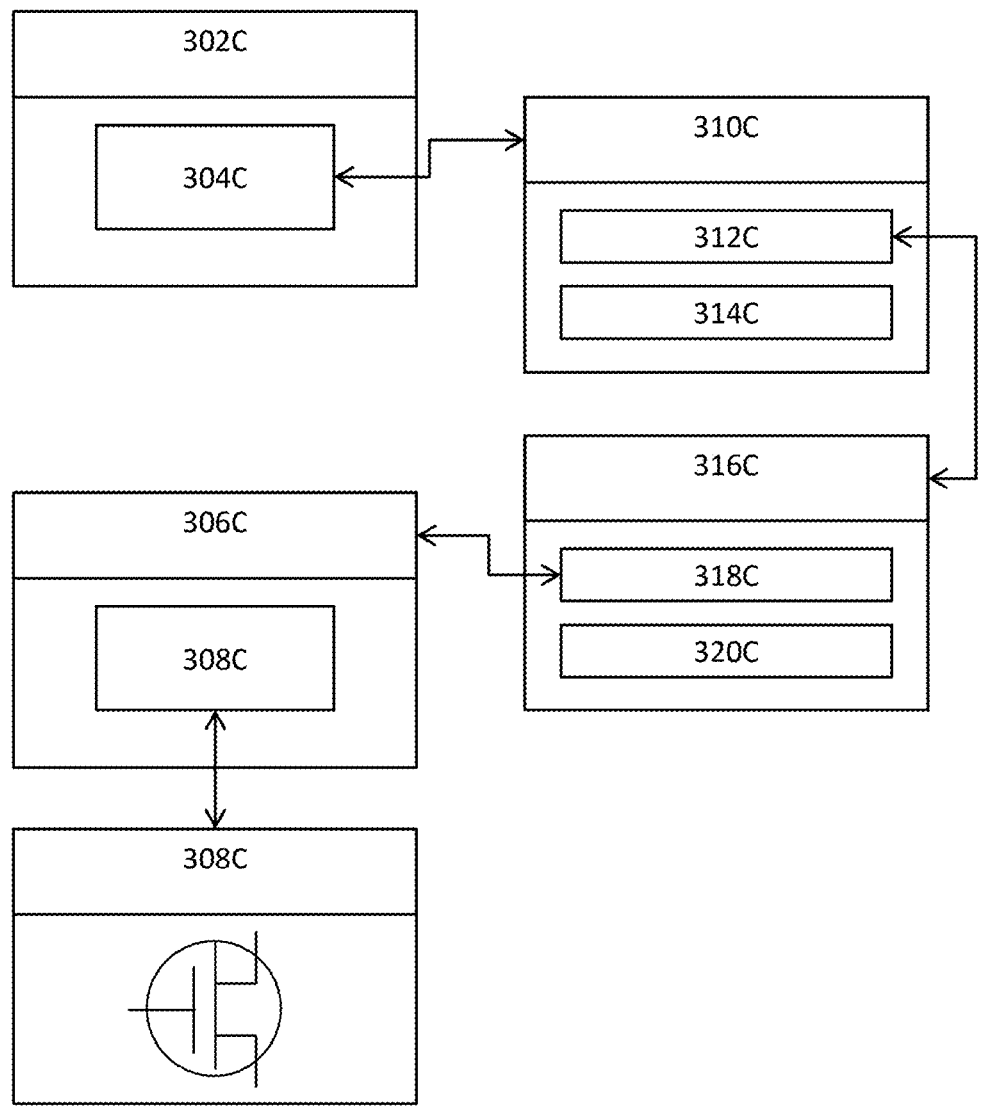
FIG. 3C illustrates a simplified test bench design including various instances to which various techniques and methodologies apply in some embodiments.

FIG. 3C illustrates a simplified test bench design including various instances to which various techniques and methodologies apply in some embodiments. More specifically, the simplified test bench design may include, at the first hierarchical level, the test bench design 302C including an instance 304C of a printed circuit board on a first EDA tool. The test bench design 302C may be implemented in one or more IC design tool such as an integrated circuit schematic suite or an integrated circuit layout suite to leverage the more complete and advanced editing, simulation, and/or analysis capabilities of such design tools and also to leverage the better integrated verification and/or design closure tools such as various post-layout verification tools. The test bench design 302C may exist in the test bench fabric and includes the symbolic view of the PCB design. When specific design data in the instance 304C of the PCB are inquired into or needed, the first EDA tool may identify or initiate an instance of a second EDA tool that is built to manipulate the native design data of PCB designs.

The second EDA tool may open the pertinent design data or a view 310C including the pertinent design data of the instance 304C of the PCB. The method or system described herein may further establish a correlation or link between the pertinent design data or view 310C of the PCB and the instance 304C of the PCB in the test bench 302C by using, for example a data structure to store the correlation or link. The second EDA tool may thus load the pertinent design data or view 310C that further includes a symbolic views of a first IC packaging design 312C and a symbolic view of a second IC packaging design 314C. The PCB design 310C may thus exist in the PCB fabric including symbolic views of IC packaging designs. When the design data of the IC packaging designs (e.g., 312C or 314C) are needed, the method or system may further identify or instantiate a third EDA tool (e.g., an IC packaging design tool) to load, for example, the pertinent design data or view 316C of IC packaging design 312C.

The third EDA tool may load the pertinent design data or view 316C that further includes a first die design 318C and a second die design 320C. The pertinent design data or view 316C of the IC packaging design 312C may exist in the IC packaging fabric and thus includes only the symbolic views of the die designs 318C and 320C. When the design data (e.g., schematic design data or layout data) of the die design (e.g., the first die design 318C) are needed, the third EDA tool may identify or instantiate the appropriate EDA tool (e.g., the IC schematic tool or IC layout tool) to open the pertinent design data or view (e.g., 306C) for the die design (e.g., 318C). In these embodiments illustrated in FIG. 3C, the pertinent design data or view 306C for the symbolic view 318C of the first die design includes further details of the design (e.g., schematic design of a field effect oxide or FET as shown in 308C) in the IC design fabric.

System Architecture Overview

Figure 4:
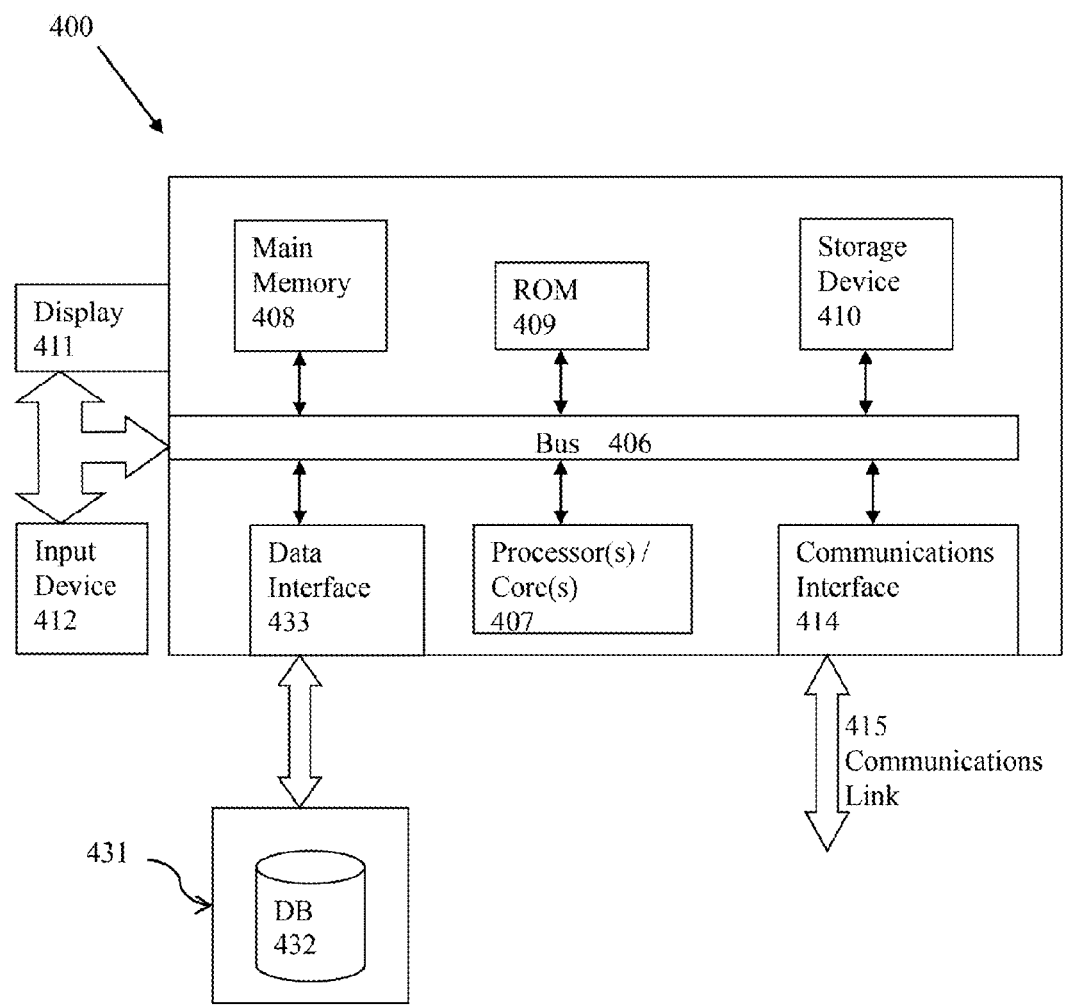
FIG. 4 illustrates a computerized system on which a method for implementing a multi-fabric electronic design across multiple design fabrics may be implemented.

FIG. 4 illustrates a block diagram of a simplified illustration of a computing system 400 suitable for FIG. 4 illustrates a computerized system on which a method for implementing, verifying or checking, and/or analyzing a multi-fabric electronic design across multiple design fabrics as described in the preceding paragraphs with reference to various figures. Computer system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the act of specifying various net or terminal sets or the act or module of performing verification, simulation, design checking, netlisting, probing, simulations, analyses, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a multi-fabric design in a multi-fabric design environment, comprising:
using at least one processor to perform a process, the process comprising:
identifying first design data in a multi-fabric electronic design using a first session of a first electronic design automation (EDA) tool in response to a request for processing the multi-fabric electronic design, wherein
the first design data are native to the first EDA tool and are non-native to a second EDA tool;
identifying second design data using a second session of the second EDA tool in response to a request for action issued by the first EDA tool for the request for processing the multi-fabric electronic design, wherein
the second design data are native to the second EDA tool but not native to the first EDA tool; and
fulfilling the request by continuing to process the second design data using the second session of the second EDA tool.

2. The computer implemented method of claim 1, the process further comprising:
generating, in a first design fabric, a symbolic representation of the second design data in the multi-fabric electronic design using the session of the second EDA tool and the second design data.

3. The computer implemented method of claim 1, wherein the first design data are created, modified, or maintained by the first EDA tool without performing a transform on the first design data, and the second design data are created, modified, or maintained by the second EDA tool without performing the first transform or a second transform on the second design data.

4. The computer implemented method of claim 1, the process further comprising:
representing the first design data as one or more first symbolic views in the second session of the second EDA tool; and
representing the second design data as one or more second symbolic views in the first session of the first EDA tool.

5. The computer implemented method of claim 4, wherein the second EDA tool has no visibility of the first design data that exist only in a first design fabric, and the first EDA tool has no visibility of the second design data that exist only in a second design fabric.

6. The computer implemented method of claim 1, the process further comprising:
tracking a state of the multi-fabric electronic design by using a data structure to monitor processing or manipulation of the multi-fabric electronic design.

7. The computer implemented method of claim 1, wherein the first design data in a first design fabric and the second design data in a second design fabric are implemented with a single set of constraints governing both the first design fabric and the second design fabric.

8. The computer implemented method of claim 7, wherein the first design data in the first design fabric and the second design data in the second design fabric are implemented with one or more respective constraints in response to the request for action, without generating new constraints.

9. The computer implemented method of claim 1, in which the first EDA tool and the second EDA tool access respective native design data and do not share design data of the multi-fabric electronic design.

10. The computer implemented method of claim 1, wherein the multi-fabric electronic design includes a partial, incomplete design that includes no design data for at least one design component in a first design fabric or in a second design fabric.

11. The computer implemented method of claim 1, wherein the multi-fabric electronic design does not satisfy one or more design rules or constraints before the request for processing the multi-fabric electronic design is fulfilled.

12. The computer implemented method of claim 1, the process further comprising:
instantiating the second session of the second EDA tool by using at least the request for action from the first session of the first EDA tool;
traversing one or more first circuit components in the first design data of the multi-fabric electronic design by using the first session of the first EDA tool; and
traversing one or more second circuit components in the second design data of the multi-fabric electronic design by using the second session of the second EDA tool.

13. The computer implemented method of claim 1, the process further comprising:
determining whether a net in the first design data or in the second design data comprises a vectored net;
splitting a net representation of the net into multiple split net representations; and
splitting an identification of the net into multiple split identifications.

14. The computer implemented method of claim 13, the process further comprising:
associating the multiple split identifications with the multiple split net representations; and
interconnecting the net with one or more corresponding circuit components in the multi-fabric electronic design by replacing the net representation with the multiple split net representations.

15. An article of manufacture comprising a non-transitory computer accessible storage medium having stored thereupon a sequence of instructions which, when executed by at least one processor or at least one processor core executing one or more threads, causes the at least one processor or the at least one processor core to perform a process for implementing a multi-fabric design in a multi-fabric design environment, the process comprising:
identifying first design data in a multi-fabric electronic design using a first session of a first electronic design automation (EDA) tool in response to a request for processing the multi-fabric electronic design, wherein
the first design data are native to the first EDA tool and are non-native to a second EDA tool;
identifying second design data using a second session of the second EDA tool in response to a request for action issued by the first EDA tool for the request for processing the multi-fabric electronic design, wherein
the second design data are native to the second EDA tool but not native to the first EDA tool; and
fulfilling the request by continuing to process the second design data using the second session of the second EDA tool.

16. The article of manufacture of claim 15, the process further comprising:

generating, in a first design fabric, a symbolic representation of the second design data in the multi-fabric electronic design using the session of the second EDA tool and the second design data.

17. The article of manufacture of claim 15, the process further comprising:
   instantiating the second session of the second EDA tool by using at least the request for action from the first session of the first EDA tool;
   traversing one or more first circuit components in the first design data of the multi-fabric electronic design by using the first session of the first EDA tool; and
   traversing one or more second circuit components in the second design data of the multi-fabric electronic design by using the second session of the second EDA tool.

18. A system for implementing a multi-fabric design in a multi-fabric design environment, comprising:
   non-transitory computer accessible storage medium storing thereupon program code; and
   at least one processor executing the program code to identify first design data in a multi-fabric electronic design using a first session of a first electronic design automation (EDA) tool in response to a request for processing the multi-fabric electronic design, wherein the first design data are native to the first EDA tool and are non-native to a second EDA tool; identify second design data using a second session of the second EDA tool in response to a request for action issued by the first EDA tool for the request for processing the multi-fabric electronic design, wherein the second design data are native to the second EDA tool but not native to the first EDA tool; and fulfill the request by continuing to process the second design data using the second session of the second EDA tool.

19. The system for claim 18, the at least one processor further executing the program code to generate, in a first design fabric, a symbolic representation of the second design data in the multi-fabric electronic design using the session of the second EDA tool and the second design data.

20. The system for claim 18, the at least one processor further executing the program code to instantiate the second session of the second EDA tool by using at least the request for action from the first session of the first EDA tool; traverse one or more first circuit components in the first design data of the multi-fabric electronic design by using the first session of the first EDA tool; and traverse one or more second circuit components in the second design data of the multi-fabric electronic design by using the second session of the second EDA tool.

* * * * *